(12) United States Patent
Funahashi et al.

(10) Patent No.: US 12,103,409 B2
(45) Date of Patent: Oct. 1, 2024

(54) ARTICLE TRANSPORT SYSTEM

(71) Applicant: Daifuku Co., Ltd., Osaka (JP)

(72) Inventors: Fumio Funahashi, Komaki (JP); Hiromichi Takaki, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 356 days.

(21) Appl. No.: 17/572,875

(22) Filed: Jan. 11, 2022

(65) Prior Publication Data

US 2022/0219551 A1    Jul. 14, 2022

(30) Foreign Application Priority Data

Jan. 12, 2021 (JP) ................................. 2021-002843

(51) Int. Cl.
*B60L 53/12* (2019.01)
*B60L 50/50* (2019.01)
*B65G 35/00* (2006.01)

(52) U.S. Cl.
CPC ............... *B60L 53/12* (2019.02); *B60L 50/50* (2019.02); *B65G 35/00* (2013.01); *B60L 2200/44* (2013.01)

(58) Field of Classification Search
CPC ...... B60L 53/12; B60L 50/50; B60L 2200/44; B60L 2200/36; B60L 2260/32; B60L 58/21; B60L 53/38; B60L 58/18; B65G 35/00; B65G 2201/0258; B65G 1/0492; B65G 1/1373; H02J 7/00032; H02J 7/0014; H02J 7/0025; H02J 7/342; H02J 50/10; H02J 50/80; B66F 9/063; B66F 9/07572

See application file for complete search history.

(56) References Cited

U.S. PATENT DOCUMENTS

| | | | | |
|---|---|---|---|---|
| 9,425,629 B2* | 8/2016 | Kim | ...................... | H02J 7/0013 |
| 9,430,950 B2* | 8/2016 | Hayashi | .................. | B60L 53/30 |
| 10,734,847 B2* | 8/2020 | Liu | ......................... | H02J 50/10 |
| 11,557,924 B2* | 1/2023 | Chen | ..................... | H02J 50/402 |
| 11,952,026 B2* | 4/2024 | Harasaki | .......... | H01L 21/67727 |
| 2015/0001950 A1* | 1/2015 | Chung | ................... | H02J 50/90 |
| | | | | 307/104 |

FOREIGN PATENT DOCUMENTS

| | | | | |
|---|---|---|---|---|
| CN | 114650930 A | * | 6/2022 | ............... B60K 1/00 |
| CN | 217824375 U | * | 11/2022 | |
| DE | 102022128505 A1 | * | 5/2024 | |
| JP | 2014117067 A | * | 6/2014 | |

(Continued)

*Primary Examiner* — James A Shriver, II
*Assistant Examiner* — Michael T. Walsh
(74) *Attorney, Agent, or Firm* — The Webb Law Firm

(57) ABSTRACT

A control unit selectively executes a first control of, while the unmanned transport vehicle is holding the transport body on the holding section, receiving electric power from the second electrical energy storage device via the second power transmitting unit and the first power receiving unit and at least either charging the first electrical energy storage device or supplying electric power to the travel section and a second control of, while the unmanned transport vehicle is holding the transport body on the holding section, receiving electric power from the first electrical energy storage device via the first power transmitting unit and the second power receiving unit and charging the second electrical energy storage device.

8 Claims, 6 Drawing Sheets

(56) References Cited

FOREIGN PATENT DOCUMENTS

| JP | 2015043238 A | * | 3/2015 | ............ B60L 11/182 |
| JP | 2022032639 A | * | 2/2022 | |
| KR | 20200039229 A | * | 4/2020 | |
| WO | WO-2014171774 A1 | * | 10/2014 | .............. H02J 17/00 |
| WO | WO-2021208621 A1 | * | 10/2021 | |

* cited by examiner

ARTICLE TRANSPORT SYSTEM

CROSS-REFERENCE TO RELATED APPLICATION

This application claims priority to Japanese Patent Application No. 2021-002843 filed Jan. 12, 2021, the disclosure of which is hereby incorporated by reference in its entirety.

BACKGROUND OF THE INVENTION

1. Field of the Invention

The present invention relates to an article transport system provided with a plurality of transport bodies on each of which an article is placeable or each of which is configured to house the article, a plurality of unmanned transport vehicles for transporting the transport bodies, and a control unit for controlling the transport bodies and the unmanned transport vehicles.

2. Description of the Related Art

An example of such an article transport system is described in JP 2014-117067 (Patent Document 1). In the following description of the related art, the reference signs and names used in Patent Document 1 are put in parentheses.

The article transport system of Patent Document 1 is provided with an unmanned transport vehicle (10) including a first electrical energy storage device (vehicle side battery 14) and a transport body (pallet 20) including a second electrical energy storage device (pallet side battery 24). Also, the transport body (20) is provided with a power supply unit capable of supplying electric power of the second electrical energy storage device (24) to an external component, and the unmanned transport vehicle (10) is provided with a power receiving unit capable of receiving electric power from the power supply unit of the transport body (20). Also, when the transport body (20) is placed on the unmanned transport vehicle (10), the unmanned transport vehicle (10) runs on the electric power from the second electrical energy storage device (24) and charges the first electrical energy storage device (14), and when the transport body (20) is not placed on the unmanned transport vehicle (10), the unmanned transport vehicle (10) runs on the electric power from the first electrical energy storage device (14). The first electrical energy storage device (14) and the second electrical energy storage device (24) are charged by a charging device (charger 40) installed at a station (ST) where the unmanned transport vehicle (10) picks up or puts down the transport body (20).

SUMMARY OF THE INVENTION

However, in the article transport system of Patent Document 1, depending on the overall layout of the system, for example, there may be too many transport bodies in actual operation relative to the number of charging devices. In such cases, the charge amount of the second electrical energy storage device of a transport body may be insufficient, resulting in a sufficient amount of electric power being unable to be supplied to the unmanned transport vehicle. If such a situation occurs, the operation efficiency of the unmanned transport vehicles is decreased. Also, such a situation is likely to occur in a busy period when there is a large number of transport bodies to be transported by the unmanned transport vehicles. On the other hand, by installing many charging devices to accommodate for the busy period, a charging device excess is created in the slack periods. This increases the cost of the article transport system and constricts the space of the facility where the article transport system is installed due to the space taken up by the charging devices.

Thus, there is a need for an article transport system capable of minimizing or preventing a decrease in the operation efficiency of an unmanned transport vehicle in a busy period without having an excessive number of charging devices.

An article transport system according to the present disclosure includes: a plurality of transport bodies on each of which an article is placeable or each of which is configured to house the article; a plurality of unmanned transport vehicles each configured to transport the transport body; and a control unit configured to control the transport bodies and the unmanned transport vehicles, wherein each of the unmanned transport vehicles: includes a first electrical energy storage device; a travel section configured to travel on electric power from the first electrical energy storage device, a holding section configured to hold the transport bodies; a first power receiving unit configured to receive electric power from an external power source and at least either charge the first electrical energy storage device or supply electric power to the travel section; and a first power transmitting unit configured to transmit electric power of the first electrical energy storage device to an external component; each of the transport bodies includes: a second electrical energy storage device; a second power receiving unit configured to receive electric power from an external power source and charge the second electrical energy storage device; and a second power transmitting unit configured to transmit electric power of the second electrical energy storage device to an external component; and the control unit is configured to selectively execute a first control of, while the unmanned transport vehicle is holding the transport body on the holding section, receiving electric power from the second electrical energy storage device via the second power transmitting unit and the first power receiving unit and at least either charging the first electrical energy storage device or supplying electric power to the travel section and a second control of, while the unmanned transport vehicle is holding the transport body on the holding section, receiving electric power from the first electrical energy storage device via the first power transmitting unit and the second power receiving unit and charging the second electrical energy storage device.

According to the present configuration, the first control, in which electric power from the second electrical energy storage device of the transport body is supplied to at least one of the first electrical energy storage device of the unmanned transport vehicle and the travel section, and the second control, in which electric power from the first electrical energy storage device of the unmanned transport vehicle is supplied to the second electrical energy storage device of the transport body, can be selectively executed. Thus, the balance in the charge amount between the first electrical energy storage devices of the plurality of unmanned transport vehicles and the second electrical energy storage devices of the plurality of transport bodies in the article transport system overall can be constantly appropriately adjusted. Accordingly, for example, in the slack period, supply of electric power from the first electrical energy storage device of the unmanned transport vehicle not assigned with a transportation task to the second electrical energy storage device of the transport body can be actively performed. Thus, the number of times the transport bodies are transported to the charging devices can be kept to a minimum, and the charge amount of the second electrical energy storage devices of the transport bodies can be quickly increased. Also, in the busy period, supply of electric power from the second electrical energy storage device of the transport body with a large charge amount to the first electrical energy storage device of the unmanned transport vehicle can be actively performed. Thus, the number of times the unmanned transport vehicles are moved to the charging devices can be kept to a minimum, and many articles and transport bodies can be transported. In this manner, a decrease in the operation efficiency of an unmanned transport vehicle in a busy period can be minimized or prevented without having an excessive number of charging devices.

Advantages and effects of the article transport system will be made clear from the embodiments described below with reference to the drawings.

DETAILED DESCRIPTION OF PREFERRED EMBODIMENTS

First Embodiment

An article transport system according to the first embodiment will be described with reference to the drawings (FIGS. 1 to 8).

Figure 1:
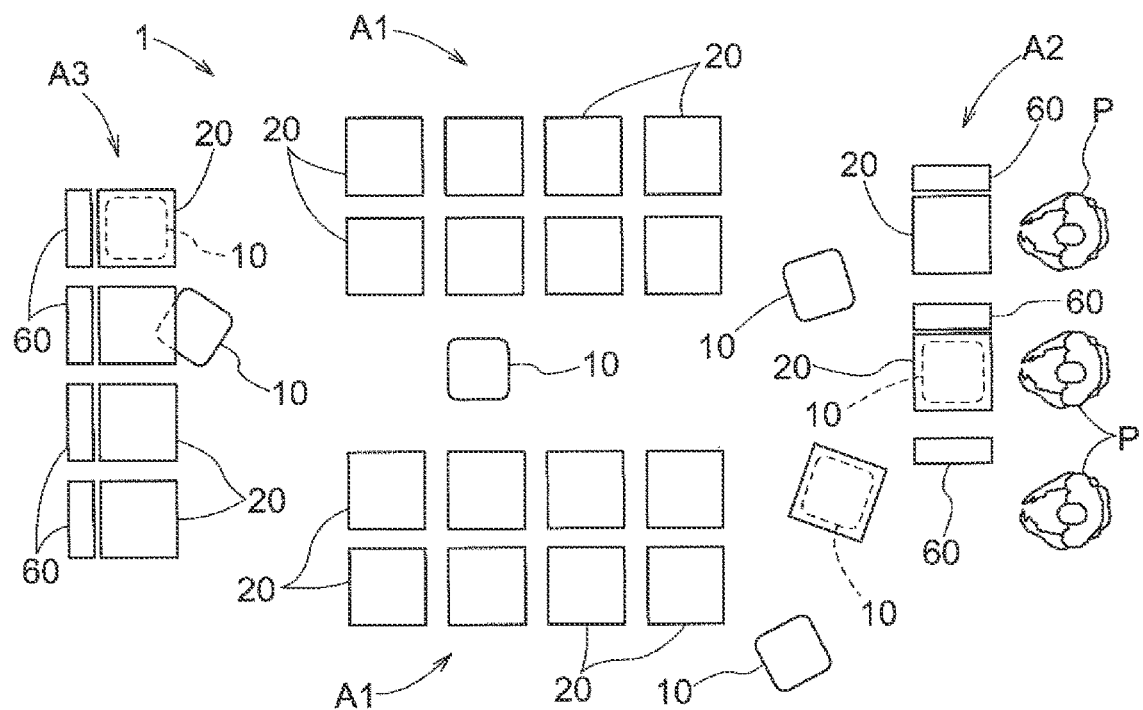
FIG. 1 is a schematic plan view of an article transport facility using an article transport system.
Figure 5:
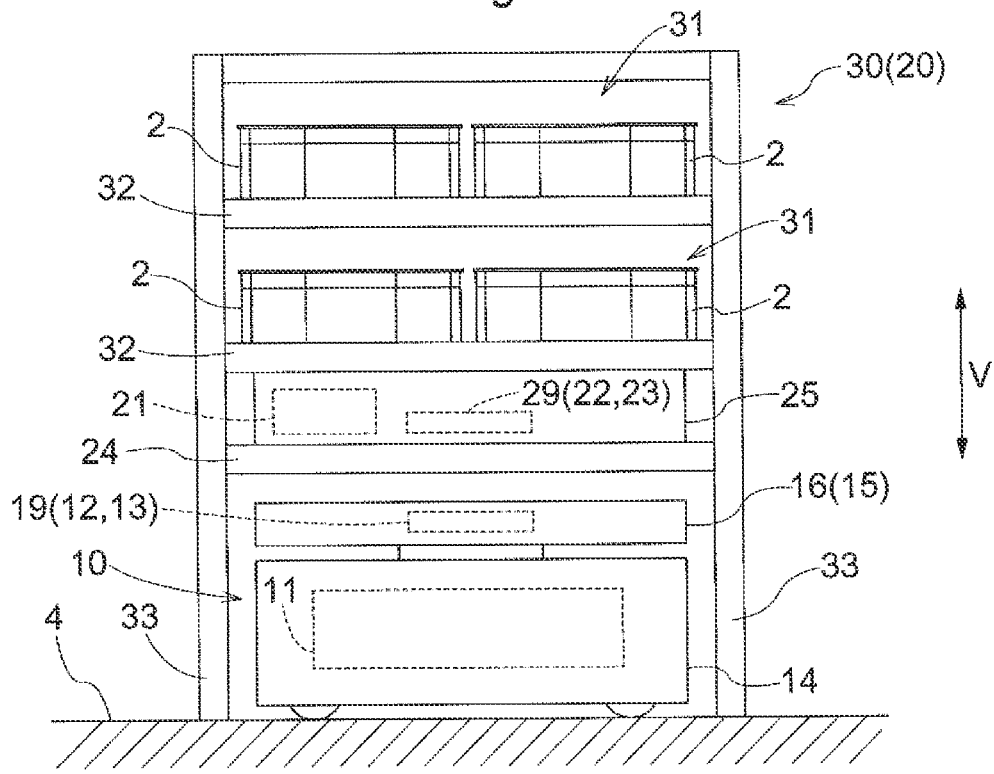
FIG. 5 is a side view of an unmanned transport vehicle and a transport body in a non-held state according to a first embodiment.

An article transport system 1 is a system for transporting articles 2 (see FIG. 5). The article transport system 1 is used in an article transport facility such as the example illustrated in FIG. 1. As illustrated in FIG. 1, the article transport system 1 is provided with a plurality of transport bodies 20 on each of which an article 2 (see FIG. 5) is placeable or each of which is configured to house the article 2, and a plurality of unmanned transport vehicles 10 each configured to transport the transport body 20. The article transport system 1 is further provided with charging devices 60 for charging the unmanned transport vehicles 10 (specifically, a first electrical energy storage device 11 described below) and the transport bodies 20 (specifically, a second electrical energy storage device 21 described below). In the present embodiment, the articles 2 are articles housing a load (not illustrated) such as a product. The articles 2 may be containers, corrugated cardboard boxes, or the like, for example.

As illustrated in FIG. 5, the unmanned transport vehicle 10 is provided with a travel section 14 and a holding section 15 for holding the transport body 20. The unmanned transport vehicle 10 is a transport vehicle capable of autonomous travel. In the present embodiment, the travel section 14 is provided with wheels that roll on a floor 4, and the unmanned transport vehicle 10 autonomously travels along the floor 4. The unmanned transport vehicle 10 drives the travel section 14 by rotating the wheels via drive power from a drive power source such as an electric motor. The movement operation of the unmanned transport vehicles 10 is caused by the travel operation of the travel section 14.

In the present embodiment, the holding section 15 holds the transport body 20 by supporting the transport body 20 from below. Specifically, the unmanned transport vehicle 10 (specifically, the holding section 15) is provided with a placement section 16 on which the transport body 20 is placeable. A placed section 24, described below, of the transport body 20, is placed on the placement section 16. The transport body 20 is placed on the placement section 16 while being held by the holding section 15. In the present embodiment, the holding section 15 is supported by the travel section 14 in a manner allowing it to move vertically. The unmanned transport vehicle 10 raises and lowers the holding section 15 via drive power from a drive power source such as an electric motor.

Figure 6:
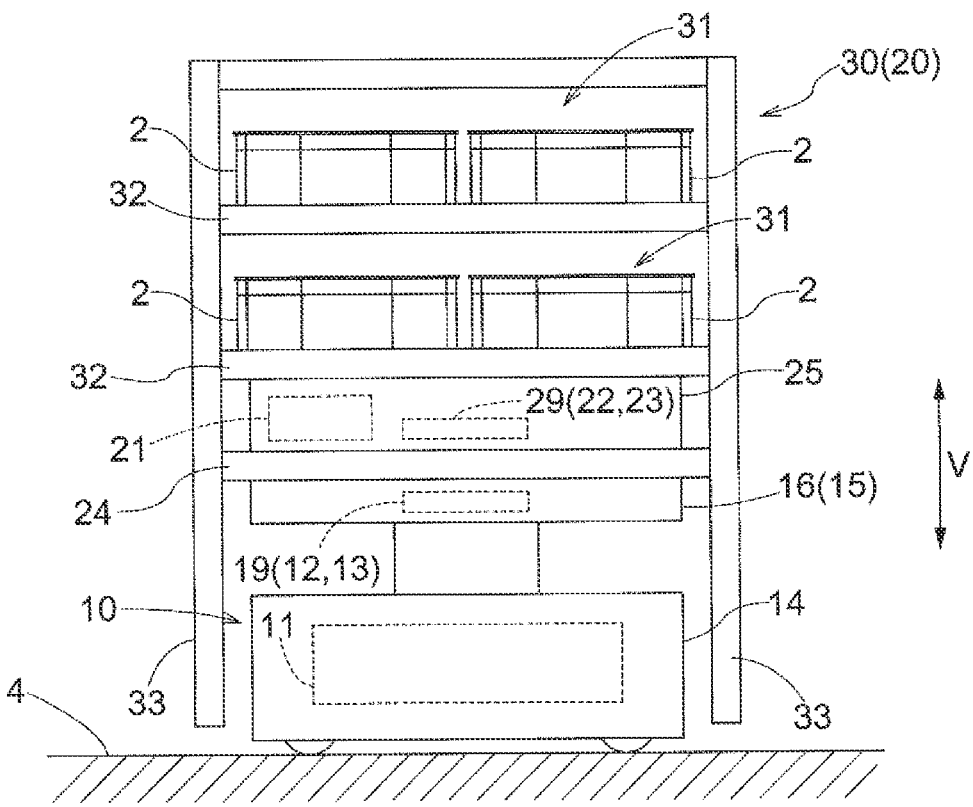
FIG. 6 is a side view of the unmanned transport vehicle and the transport body in a held state according to the first embodiment.

The unmanned transport vehicles 10 holds the transport body 20 via the holding section 15 by, after moving under the transport body 20 (see FIG. 5) with the holding section 15 in a lowered state, raising the holding section 15 and raising the transport body 20 off the floor 4 (see FIG. 6). The unmanned transport vehicle 10 transports the transport body 20 by moving with the transport body 20 held by the holding section 15 (in other words, with the transport body 20 placed on the placement section 16). Then, the unmanned transport vehicle 10, after moving to a position of a transportation destination D, lowers the holding section 15 and lowers the transport body 20 to the floor 4 (see FIG. 5). In this manner, in the present embodiment, the holding operation of the transport body 20 by the holding section 15 is performed via a raising operation of the holding section 15, and the hold releasing operation of the transport body 20 by the holding section 15 is performed via a lowering operation of the holding section 15.

Figure 2:
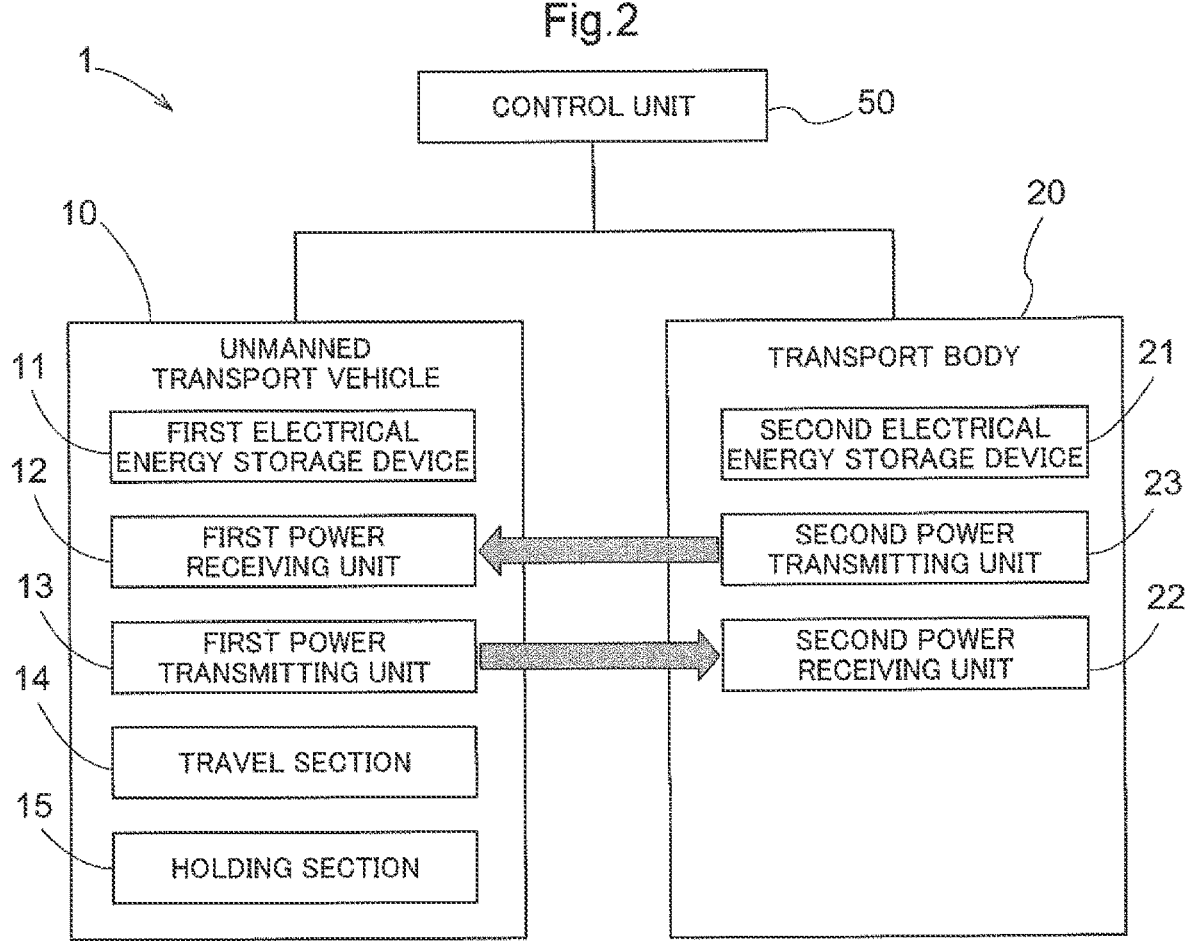
FIG. 2 is a control block diagram.

As illustrated in FIGS. 2 and 5, the unmanned transport vehicle 10 is provided with the first electrical energy storage device 11, a first power receiving unit 12, and a first power transmitting unit 13. In the present embodiment, the first power receiving unit 12 and the first power transmitting unit 13 are disposed (see FIG. 5) on the holding section 15 (specifically, the placement section 16). The first electrical energy storage device 11 is electrically connected to the travel section 14. Note that "electrically connected" includes in its meaning both being connected via a wired connection or a wireless (i.e., non-contact) connection. In the present embodiment, the first electrical energy storage device 11 is disposed on the travel section 14 (see FIG. 5). The travel section 14 receives a supply of electric power from the first electrical energy storage device 11 to travel. The drive power source (for example, an electric motor) of the travel section 14 generates the travel drive power of the travel section 14 via electric power supplied from the first electrical energy storage device 11. The travel section 14 may also receive a supply of electric power from the first power receiving unit 12 to travel. The first electrical energy storage device 11 is an electrical energy storage device capable of charging and discharging and is a battery or capacitor, for example. A sensor for detecting the charge amount is provided on the first electrical energy storage device 11.

The first power receiving unit 12 receives electric power from an external (external to the unmanned transport vehicle 10) power source and at least either charge the first electrical energy storage device 11 or supply electric power to the travel section 14. In the present embodiment, the electric power received by the first power receiving unit 12 can be directly supplied to the travel section 14 bypassing the first electrical energy storage device 11. The first power receiving unit 12 (specifically, a power receiving circuit of the first power receiving unit 12) is electrically connected to the first electrical energy storage device 11 and electrically connected to the travel section 14. The first power receiving unit 12 is provided with a first power receiving connection unit 12a (see FIG. 7) for receiving a supply of electric power from an external power source and supplies the electric power received at the first power receiving connection unit 12a to the supply destination (the first electrical energy storage device 11 or the travel section 14). In the present embodiment, the first power receiving connection unit 12a is disposed in the holding section 15 (specifically, the placement section 16). The power receiving operation by the first power receiving unit 12 (specifically the operation of the power receiving circuit electrically connected to the first power receiving connection unit 12a) is controlled by a controller (power receiving controller) provided in the unmanned transport vehicle 10. The power receiving operation by the first power receiving unit 12 includes an operation of charging the first electrical energy storage device 11 via electric power received by the first power receiving unit 12 and an operation of supplying the travel section 14 with electric power received by the first power receiving unit 12, and the charging operation and the supplying operation can be performed in parallel.

Supplying electric power from the external power source (for example, the transport body 20 or the charging device 60) to the first power receiving unit 12 may be performed via an electromagnetic induction method or a magnetic field resonance method via a non-contact method (wireless method) or a contact method (wired method), for example. In a case where the electric power is supplied from the external power source to the first power receiving unit 12 using a non-contact method, the first power receiving connection unit 12a is provided with a non-contact connection unit (for example, a power receiving coil), and electric power is supplied with the non-contact connection unit and a non-contact connection unit (for example, a power transmitting coil) of the external power source being electrically connected to one another via a non-contact method. In a case where the electric power is supplied from the external power source to the first power receiving unit 12 using a contact method, the first power receiving connection unit 12a is provided with a contact connection unit (for example, a power receiving terminal), and electric power is supplied with the contact connection unit and a contact connection unit (for example, a power transmitting terminal) of the external power source being electrically connected to one another via contact. In another possible configuration, the first power receiving connection unit 12a is provided with both a non-contact connection unit and a contact connection unit, and electric power can be supplied from the external power source to the first power receiving unit 12 via either a non-contact method or a contact method. A possible configuration includes electric power being supplied from the transport body 20 (specifically, the second electrical energy storage device 21 described below) to the first power receiving unit 12 via a non-contact method and electric power being supplied from the charging device 60 to the first power receiving unit 12 via a contact method.

The first power transmitting unit 13 transmits the electric power of the first electrical energy storage device 11 to an external component. The first power transmitting unit 13 (specifically, a power transmitting circuit of the first power transmitting unit 13) is electrically connected to the first electrical energy storage device 11. The first power transmitting unit 13 is provided with a first power transmitting connection unit 13a (see FIG. 7) for supplying electric power to an external component and supplies the electric power of the first electrical energy storage device 11 from the first power transmitting connection unit 13a to an external component. In the present embodiment, the first power transmitting connection unit 13a is disposed in the holding section 15 (specifically, the placement section 16). The power transmitting operation by the first power transmitting unit 13 (specifically the operation of the power transmitting circuit electrically connected to the first power transmitting connection unit 13a) is controlled by a controller (power transmitting controller) provided in the unmanned transport vehicle 10.

Supplying the electric power from the first power transmitting unit 13 to the external supply target (for example, the transport body 20) may be performed by a non-contact method or a contact method. In a case where the electric power is supplied from the first power transmitting unit 13 to the external supply target using a non-contact method, the first power transmitting connection unit 13a is provided with a non-contact connection unit (for example, a power transmitting coil), and electric power is supplied with the non-contact connection unit and a non-contact connection unit (for example, a power receiving coil) of the external supply target being electrically connected to one another via a non-contact method. In a case where the electric power is supplied from the first power transmitting unit 13 to the external supply target using a contact method, the first power transmitting connection unit 13a is provided with a contact connection unit (for example, a power transmitting terminal), and electric power is supplied with the contact connection unit and a contact connection unit (for example, a power receiving terminal) of the external supply target being electrically connected to one another via contact. In another possible configuration, the first power transmitting connection unit 13a is provided with both a non-contact connection unit and a contact connection unit, and electric power can be supplied from the first power transmitting unit 13 to the external supply target via either a non-contact method or a contact method.

Figure 7:
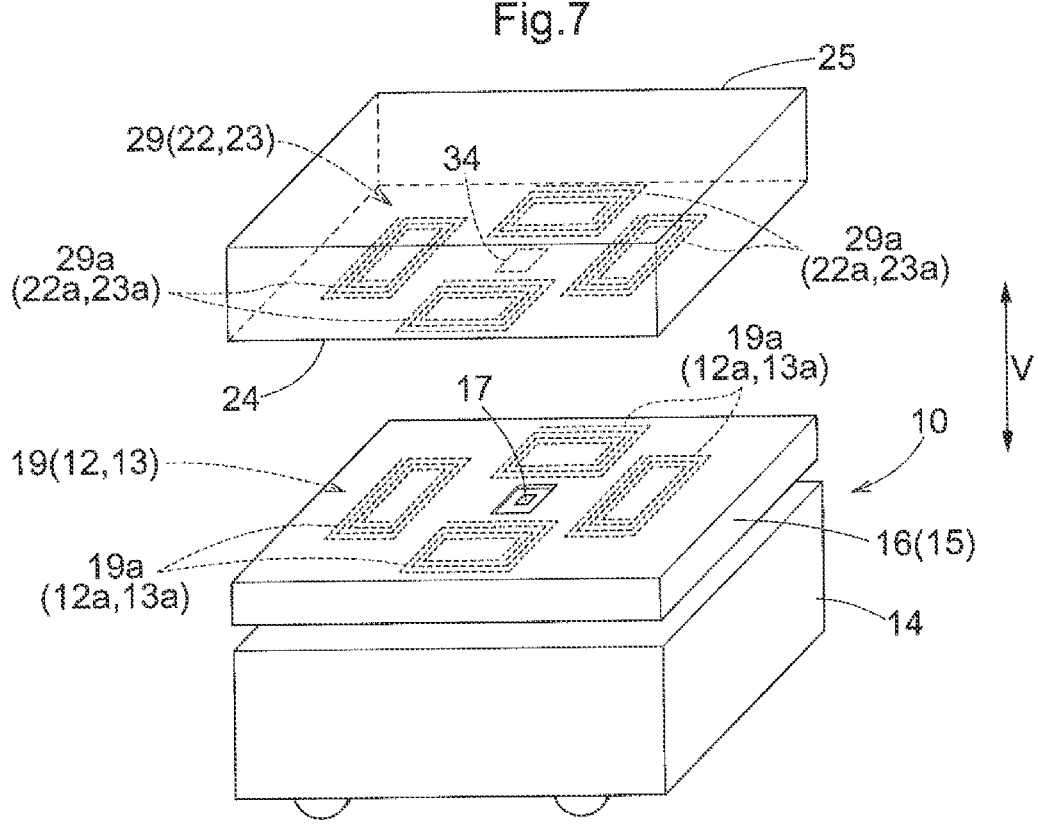
FIG. 7 is a perspective view illustrating a portion of the unmanned transport vehicle and the transport body according to the first embodiment.

In the present embodiment, as illustrated in FIG. 7, the unmanned transport vehicle 10 is provided with a first power transmitting and receiving unit 19 that functions as both the first power receiving unit 12 and the first power transmitting unit 13, and the first power transmitting and receiving unit 19 is provided with a first power transmitting and receiving connection unit 19*a* that functions as both the first power receiving connection unit 12*a* and the first power transmitting connection unit 13*a*. The first power transmitting and receiving connection unit 19*a* is provided with at least one of a non-contact connection unit (for example, a power transmitting and receiving coil) and a contact connection unit (for example, a power transmitting and receiving terminal). The first power transmitting and receiving unit 19 is provided with a power transmitting and receiving circuit capable of operating as either a power receiving circuit or a power transmitting circuit; and when the power transmitting and receiving circuit operates as a power receiving circuit, the first power transmitting and receiving unit 19 functions as the first power receiving unit 12, and when the power transmitting and receiving circuit operates as a power transmitting circuit, the first power transmitting and receiving unit 19 functions as the first power transmitting unit 13. The power transmitting and receiving operation by the first power transmitting and receiving unit 19 (specifically the operation of the power transmitting and receiving circuit electrically connected to the first power transmitting and receiving connection unit 19*a*) is controlled by a controller (power transmitting and receiving controller) provided in the unmanned transport vehicle 10. The power transmitting and receiving operation by the first power transmitting and receiving unit 19 includes the power receiving operation by the first power receiving unit 12 and the power transmitting operation by the first power transmitting unit 13.

As illustrated in FIG. 6, in the present embodiment, the transport body 20 is provided with the placed section 24 which is placed on the placement section 16 of the unmanned transport vehicle 10. In the present embodiment, the transport body 20 is a housing shelf 30 for housing the articles 2. The housing shelf 30 is provided with a housing section 31 where the articles 2 are housed. The housing shelf 30 is provided with a shelf 32 where the articles 2 are placed, with the shelf 32 forming the housing section 31. In this example, the housing shelf 30 is provided with the shelves 32 at a plurality of positions (specifically, two positions) in a vertical direction V (an up-down direction), and a plurality of the housing sections 31 (specifically, two housing sections 31) are formed side by side in the vertical direction V. In this manner, in the present embodiment, the transport body 20 (housing shelf 30) is provided with the housing sections 31 arranged next to one another in the vertical direction V, allowing the articles 2 to be housed in the housing sections 31 at a plurality of levels.

As illustrated in FIG. 5, in the present embodiment, the housing shelf 30 is provided with leg portions 33 extending downward from the placed section 24, and the housing shelf 30 is placed on the floor 4 by the leg portions 33 coming into contact with the floor 4. The length of the leg portions 33 in the vertical direction V is set so as to form a space between the placed section 24 and the floor 4 into which the unmanned transport vehicle 10 can enter when the housing shelf 30 is placed on the floor 4.

As illustrated in FIGS. 2 and 5, the transport body 20 is provided with the second electrical energy storage device 21, a second power receiving unit 22, and a second power transmitting unit 23. The second electrical energy storage device 21 is an electrical energy storage device capable of charging and discharging and is a battery or capacitor, for example. A sensor for detecting the charge amount is provided on the second electrical energy storage device 21. The second electrical energy storage device 21, for example, is an electrical energy storage device compatible with the capacity of the first electrical energy storage device 11.

As illustrated in FIG. 5, in the present embodiment, the second power receiving unit 22 and the second power transmitting unit 23 are below a lowermost one of the housing sections 31 of the transport body 20. In other words, the second power receiving unit 22 and the second power transmitting unit 23 are arranged in a position which is lower than the lowest housing section 31 of the transport body 20 and where the second power receiving unit 22 and the second power transmitting unit 23 overlap the housing sections 31 as seen in a plan view (as seen in a direction aligned with the vertical direction V). In this example, the transport body 20 is provided with a power storage unit 25 including the second electrical energy storage device 21, the second power receiving unit 22, and the second power transmitting unit 23 integrating into one unit. Also, the power storage unit 25 is disposed below the lowest housing section 31 in the transport body 20.

The second power receiving unit 22 receives electric power from an external (external to the transport body 20) power source and charges the second electrical energy storage device 21. The second power receiving unit 22 (specifically, a power receiving circuit of the second power receiving unit 22) is electrically connected to the second electrical energy storage device 21. The second power receiving unit 22 is provided with a second power receiving connection unit 22*a* (see FIG. 7) for receiving a supply of electric power from an external power source and supplies the electric power received at the second power receiving connection unit 22*a* to the second electrical energy storage device 21. In the present embodiment, the second power receiving connection unit 22*a* is disposed in the placed section 24. In the example illustrated in FIG. 5, the placed section 24 and the power storage unit 25 are distinct components, but the placed section 24 may be a part of the power storage unit 25 or, as in the example illustrated in FIG. 7, the lower portion of the power storage unit 25 may correspond to the placed section 24. The power receiving operation by the second power receiving unit 22 (specifically the operation of the power receiving circuit electrically connected to the second power receiving connection unit 22*a*) is controlled by a controller (power receiving controller) provided in the transport body 20.

Supplying the electric power from the external power source (for example, the unmanned transport vehicles 10 or the charging device 60) to the second power receiving unit 22 may be performed via a non-contact method or a contact method. In a case where the electric power is supplied from the external power source to the second power receiving unit 22 using a non-contact method, the second power receiving connection unit 22*a* is provided with a non-contact connection unit (for example, a power receiving coil), and electric power is supplied with the non-contact connection unit and a non-contact connection unit (for example, a power transmitting coil) of the external power source being electrically connected to one another via a non-contact method. In a case where the electric power is supplied from the external power source to the second power receiving unit 22 using a contact method, the second power receiving connection unit 22*a* is provided with a contact connection unit (for example, a power receiving terminal), and electric power is supplied with the contact connection unit and a contact connection unit (for example, a power transmitting terminal) of the external power source being electrically connected to one another via contact. In another possible configuration, the second power receiving connection unit 22a is provided with both a non-contact connection unit and a contact connection unit, and electric power can be supplied from the external power source to the second power receiving unit 22 via either a non-contact method or a contact method. A possible configuration includes electric power being supplied from the unmanned transport vehicles 10 (specifically, the first electrical energy storage device 11) to the second power receiving unit 22 via a non-contact method and electric power being supplied from the charging device 60 to the second power receiving unit 22 via a contact method.

The second power transmitting unit 23 transmits the electric power of the second electrical energy storage device 21 to an external component. The second power transmitting unit 23 (specifically, the power transmitting circuit of the second power transmitting unit 23) is electrically connected to the second electrical energy storage device 21. The second power transmitting unit 23 is provided with a second power transmitting connection unit 23a (see FIG. 7) for supplying electric power to an external component and supplies the electric power of the second electrical energy storage device 21 from the second power transmitting connection unit 23a to an external component. In the present embodiment, the second power transmitting connection unit 23a is disposed in the placed section 24. The power transmitting operation by the second power transmitting unit 23 (specifically the operation of the power transmitting circuit electrically connected to the second power transmitting connection unit 23a) is controlled by a controller (power transmitting controller) provided in the transport body 20.

Supplying the electric power from the second power transmitting unit 23 to the external supply target (for example, the unmanned transport vehicle 10) may be performed by a non-contact method or a contact method. In a case where the electric power is supplied from the second power transmitting unit 23 to the external supply target using a non-contact method, the second power transmitting connection unit 23a is provided with a non-contact connection unit (for example, a power transmitting coil), and electric power is supplied with the non-contact connection unit and a non-contact connection unit (for example, a power receiving coil) of the external supply target being electrically connected to one another via a non-contact method. In a case where the electric power is supplied from the second power transmitting unit 23 to the external supply target using a contact method, the second power transmitting connection unit 23a is provided with a contact connection unit (for example, a power transmitting terminal), and electric power is supplied with the contact connection unit and a contact connection unit (for example, a power receiving terminal) of the external supply target being electrically connected to one another via contact. In another possible configuration, the second power transmitting connection unit 23a is provided with both a non-contact connection unit and a contact connection unit, and electric power can be supplied from the second power transmitting unit 23 to the external supply target via either a non-contact method or a contact method.

In the present embodiment, as illustrated in FIG. 7, the transport body 20 is provided with a second power transmitting and receiving unit 29 that functions as both the second power receiving unit 22 and the second power transmitting unit 23, and the second power transmitting and receiving unit 29 is provided with a second power transmitting and receiving connection unit 29a that functions as both the second power receiving connection unit 22a and the second power transmitting connection unit 23a. The second power transmitting and receiving connection unit 29a is provided with at least one of a non-contact connection unit (for example, a power transmitting and receiving coil) and a contact connection unit (for example, a power transmitting and receiving terminal). The second power transmitting and receiving unit 29 is provided with a power transmitting and receiving circuit capable of operating as either a power receiving circuit or a power transmitting circuit; and when the power transmitting and receiving circuit operates as a power receiving circuit, the second power transmitting and receiving unit 29 functions as the second power receiving unit 22, and when the power transmitting and receiving circuit operates as a power transmitting circuit, the second power transmitting and receiving unit 29 functions as the second power transmitting unit 23. The power transmitting and receiving operation by the second power transmitting and receiving unit 29 (specifically the operation of the power transmitting and receiving circuit electrically connected to the second power transmitting and receiving connection unit 29a) is controlled by a controller (power transmitting and receiving controller) provided in the transport body 20. The power transmitting and receiving operation by the second power transmitting and receiving unit 29 includes the power receiving operation by the second power receiving unit 22 and the power transmitting operation by the second power transmitting unit 23.

In the article transport system 1, electric power can be supplied in both directions between the unmanned transport vehicle 10 and the transport body 20. As described above, the first power receiving unit 12 is provided with the first power receiving connection unit 12a, the first power transmitting unit 13 is provided with the first power transmitting connection unit 13a, the second power receiving unit 22 is provided with the second power receiving connection unit 22a, and the second power transmitting unit 23 is provided with the second power transmitting connection unit 23a. Also, when electric power is supplied from the transport body 20 to the unmanned transport vehicle 10, the first power receiving connection unit 12a and the second power transmitting connection unit 23a are electrically connected, and when electric power is supplied from the unmanned transport vehicle 10 to the transport body 20, the first power transmitting connection unit 13a is electrically connected to the second power receiving connection unit 22a. In this manner, the first power receiving connection unit 12a is a connection unit that is electrically connected to the second power transmitting unit 23, the first power transmitting connection unit 13a is a connection unit that is electrically connected to the second power receiving unit 22, the second power receiving connection unit 22a is a connection unit that is electrically connected to the first power transmitting unit 13, and the second power transmitting connection unit 23a is a connection unit that is electrically connected to the first power receiving unit 12. Herein, "connected" means being connected when electric power is transmitted between the unmanned transport vehicle 10 and the transport body 20.

Here, the state (see FIG. 6) where the transport body 20 is supported on the holding section 15 of the unmanned transport vehicle 10 is defined as the held state. The held state includes in its meaning both a state when the unmanned transport vehicle 10 is traveling and a state when the unmanned transport vehicle 10 is stopped. In the held state, the first power receiving connection unit 12a and the second power transmitting connection unit 23a are electrically connected and the first power transmitting connection unit 13a and the second power receiving connection unit 22a are electrically connected. Thus, in the held state, electric power can be transmitted in both directions between the unmanned transport vehicle 10 and the transport body 20. In the present embodiment, electric power is transmitted between the unmanned transport vehicle 10 and the transport body 20 via a non-contact method. Thus, even in a state (see FIG. 5) where the unmanned transport vehicle 10 is not holding the transport body 20 on the holding section 15, specifically, a state where the placement section 16 is disposed opposite the placed section 24 with a gap therebetween, the first power receiving connection unit 12a and the second power transmitting connection unit 23a are electrically connected, the first power transmitting connection unit 13a and the second power receiving connection unit 22a are electrically connected, and electric power can be transmitted in both directions between the unmanned transport vehicle 10 and the transport body 20.

In the present embodiment, as schematically illustrated in FIG. 7, the first power transmitting and receiving connection unit 19a and the second power transmitting and receiving connection unit 29a are each provided with a power transmitting and receiving coil as a non-contact connection unit, and electric power is transmitted between the unmanned transport vehicle 10 and the transport body 20 via a non-contact method with the power transmitting and receiving coil of the first power transmitting and receiving connection unit 19a and the power transmitting and receiving coil of the second power transmitting and receiving connection unit 29a being disposed opposite one another (specifically, opposite one another in the vertical direction V). In the example illustrated in FIG. 7, the first power transmitting and receiving connection unit 19a and the second power transmitting and receiving connection unit 29a are each provided with a plurality (specifically, four) of power transmitting and receiving coils, and the plurality of power transmitting and receiving coils of the first power transmitting and receiving connection unit 19a are each disposed opposite to the corresponding power transmitting and receiving coils of the plurality of power transmitting and receiving coils of the second power transmitting and receiving connection unit 29a.

In the example illustrated in FIG. 7, an identification information carrier 34 for holding identification information of the transport body 20 is provided in a central portion of the placed section 24 as seen in a plan view, and a reading device 17 for reading the identification information held by the identification information carrier 34 is provided in a central portion of the placement section 16 as seen in a plan view. The identification information carrier 34, for example, is a one-dimensional code such as a barcode, a two-dimensional code such as a QR code (registered trademark), or a storage medium such as a radio frequency (RF) tag or the like. Also, the power transmitting and receiving coil of the first power transmitting and receiving connection unit 19a is provided outside of the region where the reading device 17 is disposed so that the reading device 17 is not disposed within the power transmitting and receiving coil as seen in a plan view, and the power transmitting and receiving coil of the second power transmitting and receiving connection unit 29a is provided outside of the region where the identification information carrier 34 is disposed so that the identification information carrier 34 is not disposed within the power transmitting and receiving coil as seen in a plan view. Accordingly, effects of the magnetic field from the power transmitting and receiving coil on the reading device 17 can be kept to a minimum.

Note that in cases where the effects of the magnetic field from the power transmitting and receiving coil on the reading device 17 can be minimized or prevented, such as a case where the reading device 17 does not move up and down together with the placement section 16 and is disposed lower than the power transmitting and receiving coil of the first power transmitting and receiving connection unit 19a when the placement section 16 is raised, the power transmitting and receiving coil of the first power transmitting and receiving connection unit 19a may be disposed so that the reading device 17 is not disposed within the power transmitting and receiving coil as seen in a plan view, and the power transmitting and receiving coil of the second power transmitting and receiving connection unit 29a may be disposed so that the identification information carrier 34 is not disposed within the power transmitting and receiving coil as seen in a plan view.

Figure 8:
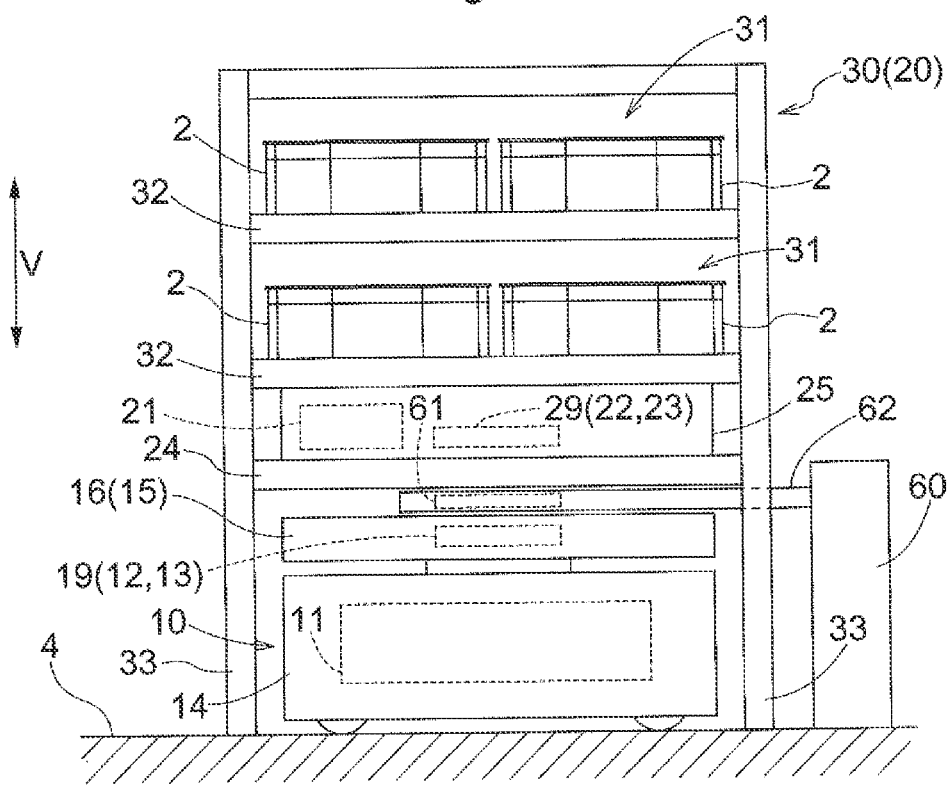
FIG. 8 is a side view of the unmanned transport vehicle, the transport body, and a charging device according to the first embodiment.

As illustrated in FIG. 8, the charging device 60 is provided with a power supply unit 61 for supplying electric power to the first power receiving unit 12 and the second power receiving unit 22. Supplying the electric power from the power supply unit 61 to the first power receiving unit 12 and the second power receiving unit 22 may be performed via a non-contact method or a contact method. In a case where the electric power is supplied from the power supply unit 61 to the first power receiving unit 12 via a non-contact method, the first power receiving connection unit 12a is provided with a non-contact connection unit (for example, a power receiving coil), and in a case where the electric power is supplied from the power supply unit 61 to the first power receiving unit 12 via a contact method, the first power receiving connection unit 12a is provided with a contact connection unit (for example, a power receiving terminal). Also, in a case where electric power is supplied from the power supply unit 61 to the second power receiving unit 22 via a non-contact method, the second power receiving connection unit 22a is provided with a non-contact connection unit (for example, a power receiving coil), and in a case where electric power is supplied from the power supply unit 61 to the second power receiving unit 22 via a contact method, the second power receiving connection unit 22a is provided with a contact connection unit (for example, a power receiving terminal).

In the present embodiment, the charging device 60 is capable of simultaneously charging both the first electrical energy storage device 11 of the unmanned transport vehicle 10 and the second electrical energy storage device 21 of the transport body 20. Specifically, as illustrated in FIG. 8, in the charging device 60, the power supply unit 61 is able to be disposed between the placement section 16 and the placed section 24 in the vertical direction V. The power supply unit 61 is disposed between the placement section 16 and the placed section 24 in the vertical direction V when the PROFFERED power supply unit 61 is supported by a support portion 62 of the charging device 60. Also, when the power supply unit 61 is disposed in this manner, the power supply unit 61 is electrically connected to both the first power receiving connection unit 12a and the second power receiving connection unit 22a and capable of simultaneously supplying electric power to the first power receiving unit 12 and the second power receiving unit 22.

FIG. 8 is a diagram illustrating an example in which electric power is intended to be supplied from the power supply unit 61 to the first power receiving unit 12 and the second power receiving unit 22 via a non-contact method. Thus, though the details are omitted herein, in the example illustrated in FIG. 8, the power supply unit 61 is provided with a power transmitting coil disposed opposite the power receiving coil (in the present embodiment, a power transmitting and receiving coil) of the first power receiving connection unit 12a and the second power receiving connection unit 22a. The power supply unit 61 may be separately provided with a power transmitting coil disposed opposite the power receiving coil (in the present embodiment, a power transmitting and receiving coil) of the first power receiving connection unit 12a and a power transmitting coil disposed opposite the power receiving coil (in the present embodiment, a power transmitting and receiving coil) of the second power receiving connection unit 22a.

As illustrated in FIG. 2, the article transport system 1 is provided with a control unit 50 configured to control the unmanned transport vehicles 10 and the transport bodies 20. The control unit 50 is communicatively connected to the unmanned transport vehicles 10 and the transport bodies 20. The control unit 50 is provided with an arithmetic processing device such as a CPU and a peripheral circuit such as a memory, and the functions of the control unit 50 are implemented by cooperation of these pieces of hardware and a program executed on the hardware such as the arithmetic processing device. FIG. 2 is a diagram illustrating an example in which the control unit 50 is provided separate from the unmanned transport vehicle 10 and the transport body 20. However, at least a portion (for example, at least the portion of the control unit 50 with the function of controlling the unmanned transport vehicle 10) of the control unit 50 may be provided in the unmanned transport vehicle 10, or at least a portion (for example, at least the portion of the control unit 50 with the function of controlling the transport body 20) of the control unit 50 may be provided in the transport body 20. Note that the technology of the control unit 50 disclosed in the present specification can be applied to a method for controlling the unmanned transport vehicles 10 and the transport bodies 20 in the article transport system 1, and a method for controlling the unmanned transport vehicles 10 and the transport bodies 20 is also disclosed in the present specification.

The unmanned transport vehicle 10 is controlled by the control unit 50 and performs the travel operation of the travel section 14, the holding and hold releasing operation of the transport body 20 by the holding section 15 (in the present embodiment, the raising and lowering operation of the holding section 15), the power receiving operation by the first power receiving unit 12 and the power transmitting operation by the first power transmitting unit 13. A controller (device controller) provided in the unmanned transport vehicle 10 controls the operations described above in response to commands from the control unit 50. Also, the transport body 20 is controlled by the control unit 50 and performs the power receiving operation by the second power receiving unit 22 and the power transmitting operation by the second power transmitting unit 23. A controller provided in the transport body 20 controls the operations described above in response to commands from the control unit 50.

The control unit 50 manages the information of the current position of the unmanned transport vehicle 10 and the information of the charge amount of the first electrical energy storage device 11 for each of the plurality of unmanned transport vehicles 10. Also, the control unit 50 manages the information of the current position of the transport body 20, the information of the article 2 placed or housed in the transport body 20 (for example, information of the type or quantity of the load housed in the article 2), and the information of the charge amount of the second electrical energy storage device 21 for each of the plurality of transport bodies 20. The charge amount of the first electrical energy storage device 11 and the second electrical energy storage device 21 is represented by a proportion (for example, a percentage) relative to the charge amount when fully charged, for example. Also, the control unit 50 controls the operations (specifically, the travel operation of the travel section 14 and the holding and hold releasing operation of the transport body 20 by the holding section 15) of the unmanned transport vehicle 10 in response to a transportation task so that the transport body 20 which is the target for transportation is transported to the transportation destination D. In this example, the transportation task is a command to be assigned to each of the plurality of unmanned transport vehicles 10 and specifying the transport body 20 to be transported and the transportation destination D of the transport body 20. The transportation task is generated by the control unit 50 or generated by another control unit (for example, a higher level control unit in the control unit 50) capable of communicating with the control unit 50.

In the present embodiment, in the article transport system to which the article transport system 1 is applied, picking is performed. Thus, in a transportation task, the transport body 20 housing the article 2 which is the picking target is specified as the transport body 20 which is the transportation target, and a work area A2 (see FIG. 1) where picking is performed is specified as the transportation destination D of the transport body 20. Accordingly, the transport body 20 housing the article 2 which is the picking target is transported to the work area A2, and, in the work area A2, picking is performed to retrieve the type and quantity of the load specified by an order from the article 2. The order is generated by the control unit 50 or another control unit on the basis of an order from shipment destination. FIG. 1 is a diagram illustrating an example in which picking is performed by workers P. However, picking may be performed by robots or the like instead of workers P.

In the example illustrated in FIG. 1, in addition to the work area A2, there is also a storage area A1 and a charging area A3. The transport bodies 20 that are not required to be transported to the work area A2 are primarily placed in the storage area A1. The charging devices 60 are provided in the charging area A3. By transporting the transport body 20 to the charging area A3, the second electrical energy storage device 21 of the transport body 20 can be charged at the charging devices 60, and by moving the unmanned transport vehicle 10 to the charging area A3, the first electrical energy storage device 11 of the unmanned transport vehicle 10 can be charged at the charging devices 60. In the example illustrated in FIG. 1, the work area A2 is also provided with the charging devices 60, allowing for the second electrical energy storage device 21 of the transport body 20 housing the article 2 which is the picking target to be charged while picking is being performed.

In the article transport system 1, at least in the held state, electric power can be transmitted in both directions between the unmanned transport vehicle 10 and the transport body 20. Also, the control unit 50 selectively executes a first control and a second control. Herein, the first control is control of, in the held state, receiving electric power from the second electrical energy storage device 21 via the second power transmitting unit 23 and the first power receiving unit 12 and at least either charging the first electrical energy storage device 11 or supplying electric power to the travel section 14. In the first control, the control unit 50 controls the power transmitting operation by the second power transmitting unit 23 and the power receiving operation by the first power receiving unit 12 so that, by receiving a supply of electric power from the second electrical energy storage device 21, at least one of charging the first electrical energy storage device 11 and supplying electric power to the travel section 14 is performed. In the first control, in a case where both the first electrical energy storage device 11 is charged by electric power received from the second electrical energy storage device 21 and electric power received from the second electrical energy storage device 21 is supplied to the travel section 14, the travel section 14 can be driven while the first electrical energy storage device 11 is being charged.

Herein, the second control is control of, in the held state, receiving a supply of electric power from the first electrical energy storage device 11 via the first power transmitting unit 13 and the second power receiving unit 22 and charging the second electrical energy storage device 21. In the second control, the control unit 50 controls the power transmitting operation by the first power transmitting unit 13 and the power receiving operation by the second power receiving unit 22 so that a supply of electric power is received from the first electrical energy storage device 11 and charging of the second electrical energy storage device 21 is performed. For example, when the control unit 50 executes the second control, in accordance with a transportation task already assigned to the unmanned transport vehicle 10, the electric power of the first electrical energy storage device 11 can be supplied from the first power transmitting unit 13 to the second power receiving unit 22 in such a manner that the first electrical energy storage device 11 keeps electric power necessary to execute the transportation task.

Next, specific examples of the control executed by the control unit 50 according to the present embodiment will be described below. However, the control unit 50 may have a configuration in which it cannot execute one or more of the controls described below.

In the present embodiment, the control unit 50 executes busy/slack determination process to determine based on at least the number of transportation tasks whether a current period is a busy period or a slack period. Herein, the "transportation task" may include in its meaning a transportation task already assigned to any one of the unmanned transport vehicles 10 or a transportation task is the determination phase for future allocation to any one of the unmanned transport vehicles 10. For example, using the ratio of unmanned transport vehicles 10 with a transportation task assigned to the total number of unmanned transport vehicles 10 as a task allocation rate, a configuration can be used in which the control unit 50 determines that a current period is a slack period in a case where the task allocation rate is less than a predetermined busy/slack determination threshold and determines that the current period is a busy period in a case where the task allocation rate is equal to or greater than the busy/slack determination threshold.

Also, in a case where the control unit 50 determines through the busy/slack determination process that a current period is a slack period, the control unit 50 executes the second control more frequently than the first control. Accordingly, in the slack period, using the unmanned transport vehicle 10 not assigned with a transportation task, supply of electric power from the first electrical energy storage device 11 of the unmanned transport vehicle 10 to the second electrical energy storage device 21 of the transport body 20 can be actively performed. As a result, the number of times the transport bodies 20 are transported to the charging devices 60 can be kept to a minimum, and the charge amount of the second electrical energy storage devices 21 of the transport bodies 20 can be quickly increased. Also, in a case where the control unit 50 determines through the busy/slack determination process that the current period is a busy period, the control unit 50 executes the first control more frequently than the second control. Accordingly, in the busy period, using the transport body 20 with a large charge amount, supply of electric power from the second electrical energy storage device 21 of the transport body 20 to the first electrical energy storage device 11 of the unmanned transport vehicle 10 can be actively performed. As a result, the number of times the unmanned transport vehicles 10 are moved to the charging devices 60 can be kept to a minimum, and many articles 2 and transport bodies 20 can be transported. Accordingly, the article transport system 1 according to the present embodiment is particularly suited to cases in which the number of transport bodies 20 is larger than the number of unmanned transport vehicles 10.

Herein, the transport body 20 which is specified as the transportation target by the transportation task is defined as the target transport body, and the unmanned transport vehicle 10 which transports the target transport body is defined as the target transport vehicle. In the present embodiment, in a case where the charge amount of the second electrical energy storage device 21 of the target transport body is equal to or smaller than a predetermined first charge threshold (in this example, in a case where the charge amount is equal to or smaller than the first charge threshold and larger than a second charge threshold) and the transportation destination D of the target transport body transported by the target transport vehicle is not the charging device 60, the control unit 50 executes the second control to charge the second electrical energy storage device 21 of the target transport body with use of the electric power of the first electrical energy storage device 11 of the target transport vehicle. Also, in the present embodiment, in a case where there is a charge-requiring transport body, which is the transport body 20 with a charge amount of the second electrical energy storage device 21 that is equal to or smaller than the second charge threshold lower than the first charge threshold, the control unit 50 assigns, to any one of the plurality of unmanned transport vehicles 10, a transportation task for which the transportation target is the charge-requiring transport body and the transportation destination D is the charging device 60, and causes the charging device 60 to charge the second electrical energy storage device 21 of the charge-requiring transport body.

Figure 3:
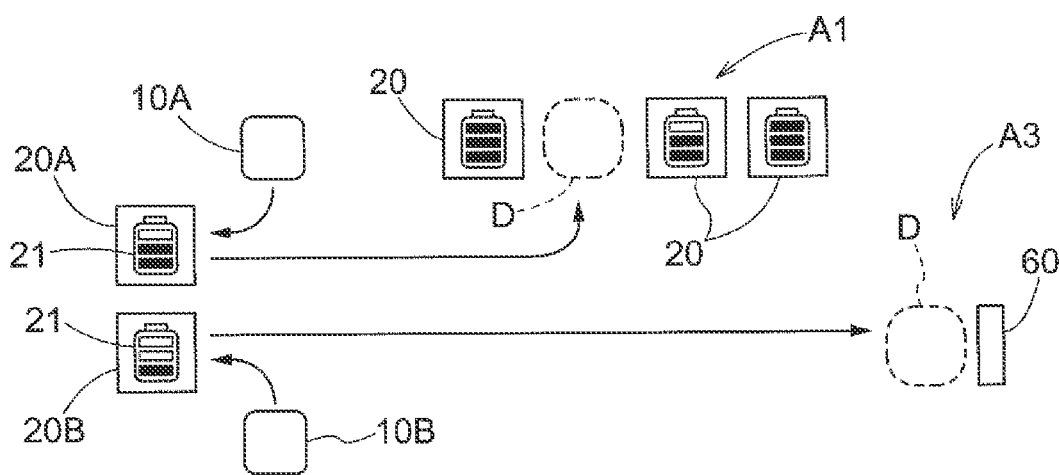
FIG. 3 is an explanatory diagram of the transportation operation of transport bodies by unmanned transport vehicles.
Figure 4:
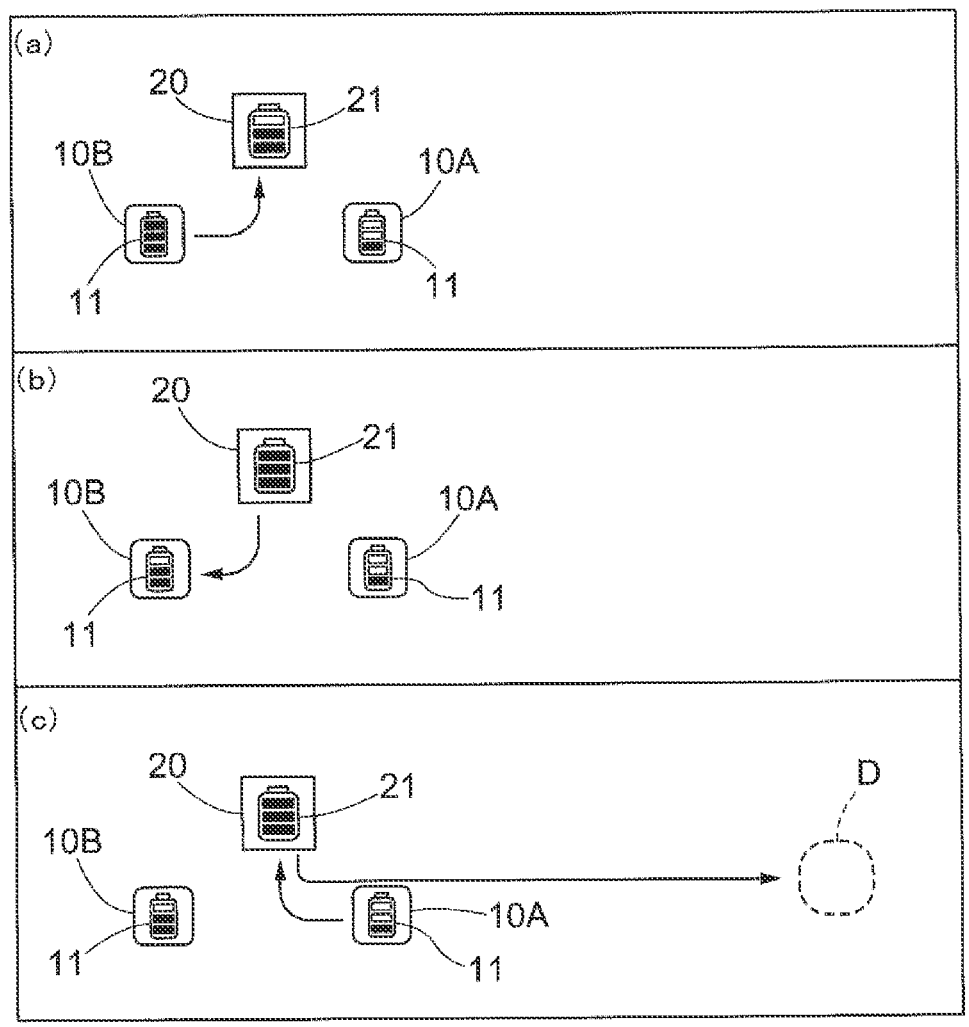
FIG. 4 is an explanatory diagram illustrating a transportation operation of transport bodies by unmanned transport vehicles in a time series.

FIG. 3 is a diagram illustrating a state in which a first unmanned transport vehicle 10A has been assigned with a transportation task in which a first transport body 20A with a charge amount of the second electrical energy storage device 21 that is equal to or smaller than the first charge threshold is set as the target transport body and the storage area A1 is set as the transportation destination D and there is a second transport body 20B which is a charge-requiring transport body present. In FIG. 3, the power storage amount of the second electrical energy storage device 21 of the transport body 20 is schematically illustrated within the border indicating the transport body 20. In the state illustrated in FIG. 3, the first unmanned transport vehicle 10A is being controlled to transport the first transport body 20A to the storage area A1, and the first unmanned transport vehicle 10A and the first transport body 20A are being controlled to execute the second control. Also, a second unmanned transport vehicle 10B is assigned with a transportation task in which the second transport body 20B is the transportation target and the charging device 60 is the transportation destination D, and the second unmanned transport vehicle 10B is controlled to transport the second transport body 20B to the charging device 60.

Also, in the present embodiment, in a case where the charge amount of the second electrical energy storage device 21 of the target transport body is equal to or smaller than a predetermined third charge threshold (in this example, in a case where the charge amount is equal to or smaller than the third charge threshold and larger than the second charge threshold) and the charge amount of the first electrical energy storage device 11 of the target transport vehicle is equal to or smaller than a fourth charge threshold, the control unit 50 executes the second control to charge the second electrical energy storage device 21 of the target transport body with use of the electric power of the first electrical energy storage device 11 of the unmanned transport vehicle 10 (hereinafter, referred to as the "specified transport vehicle") other than the target transport vehicle before start of the transport of the target transport body by the target transport vehicle. For example, in a possible configuration, the unmanned transport vehicle 10 with a charge amount of the first electrical energy storage device 11 which is equal to or larger than a fifth charge threshold greater than the fourth charge threshold can be selected as the specified transport vehicle. Note that, preferably, the unmanned transport vehicle 10 located at a position closer to the target transport body than the target transport vehicle (the unmanned transport vehicle 10 with a distance to the target transport body that is less than the distance from the target transport vehicle to the target transport body) is selected as the specified transport vehicle. Also, preferably, the second control in which the second electrical energy storage device 21 of the target transport body is charged via the electric power of the first electrical energy storage device 11 of the specified transport vehicle is started before the target transport vehicle arrives at the place where the target transport body is located. Also, in the present embodiment, even in a state where the unmanned transport vehicle 10 is not holding the transport body 20 on the holding section 15, electric power can be transmitted between the unmanned transport vehicle 10 and the transport body 20. Thus, the second electrical energy storage device 21 of the target transport body may be charged via the electric power of the first electrical energy storage device 11 of the specified transport vehicle when the specified transport vehicle is not holding the target transport body on the holding section 15.

The control unit 50 ends the second control on the condition of, for example, the charge amount of the second electrical energy storage device 21 of the target transport body reaching a sixth charge threshold greater than the third charge threshold. Alternatively, the control unit 50 ends the second control on the condition of, for example, the charge amount of the second electrical energy storage device 21 of the target transport body being larger than the third charge threshold and the target transport vehicle having arrived at the place where the target transport body is located. After the second control ends, the control unit 50 executes the first control which includes starting the transportation of the target transport body to the transportation destination D and at least one of charging the first electrical energy storage device 11 of the target transport vehicle via the electric power of the second electrical energy storage device 21 of the target transport body and supplying the electric power to the travel section 14. The third charge threshold may be a value equal to or different from the first charge threshold.

On the other hand, in a case where the charge amount of the second electrical energy storage device 21 of the target transport body is equal to or smaller than the third charge threshold and the charge amount of the first electrical energy storage device 11 of the target transport vehicle is larger than the fourth charge threshold, the control unit 50 does not execute second control, in which the second electrical energy storage device 21 of the target transport body is charged via the electric power of the first electrical energy storage device 11 of the unmanned transport vehicle 10 other than the target transport vehicle, and executes the second control, in which transportation of the target transport body to the transportation destination D is started and the second electrical energy storage device 21 of the target transport body is charged via the electric power of the first electrical energy storage device 11 of the target transport vehicle.

FIG. 4A is a diagram illustrating a state in which the charge amount of the second electrical energy storage device 21 of the transport body 20 which is the target transport body is equal to or smaller than the third charge threshold and the charge amount of the first electrical energy storage device 11 of the first unmanned transport vehicle 10A which is the target transport vehicle is equal to or smaller than the fourth charge threshold. In FIGS. 4A to 4C, the power storage amount of the first electrical energy storage device 11 of the unmanned transport vehicle 10 is schematically illustrated within the border indicating the unmanned transport vehicle 10, and the power storage amount of the second electrical energy storage device 21 of the transport body 20 is schematically illustrated within the border indicating the transport body 20. In the state illustrated in FIGS. 4A to 4C, the second unmanned transport vehicle 10B and the transport body 20 are controlled to execute the second control (see FIG. 4A) after the second unmanned transport vehicle 10B, which is the unmanned transport vehicle 10 other than the first unmanned transport vehicle 10A, is controlled to move to the place where the transport body 20 is located. When the second control ends, the second unmanned transport vehicle 10B is controlled to move away from the place where the transport body 20 is located (see FIG. 4B). Thereafter, the first unmanned transport vehicle 10A is controlled to transport the transport body 20 to the transportation destination D, and the first unmanned transport vehicle 10A and the transport body 20 are controlled to execute the first control (see FIG. 4C).

Second Embodiment

An article transport system according to the second embodiment will be described with reference to the drawings (FIGS. 9 to 12). The article transport system according to the present embodiment will be described below, focusing on the points that differ from the first embodiment. Points not explicitly described are as in the first embodiment, with the same reference sign being given and a detailed description being omitted.

Figure 9:
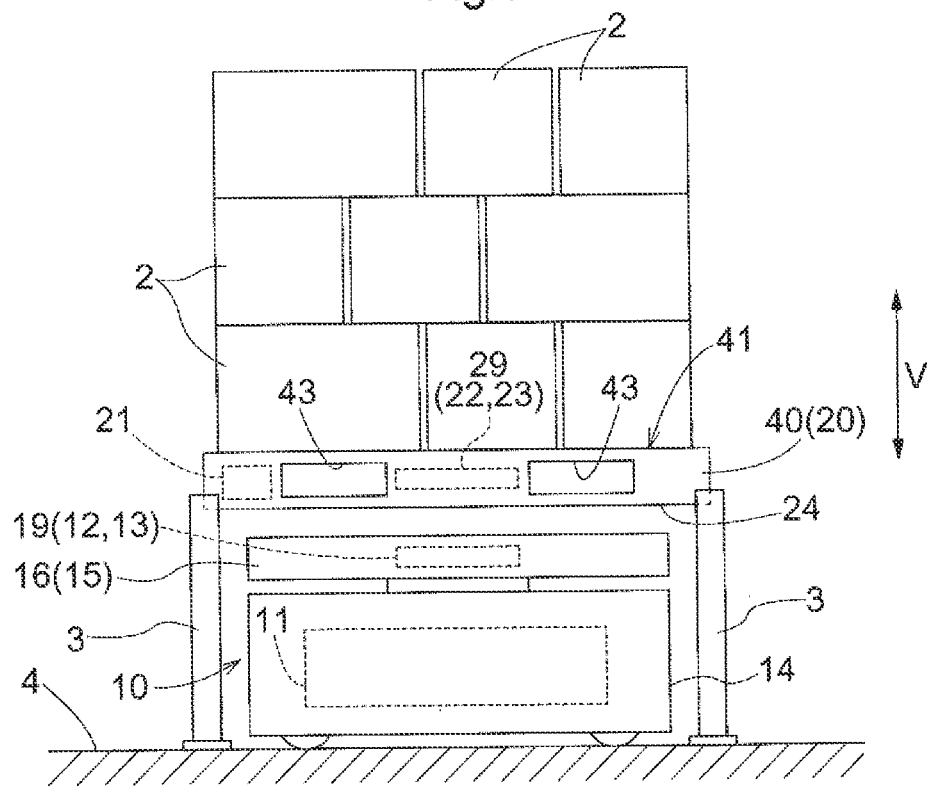
FIG. 9 is a side view of an unmanned transport vehicle and a transport body in a non-held state according to a second embodiment.
Figure 10:
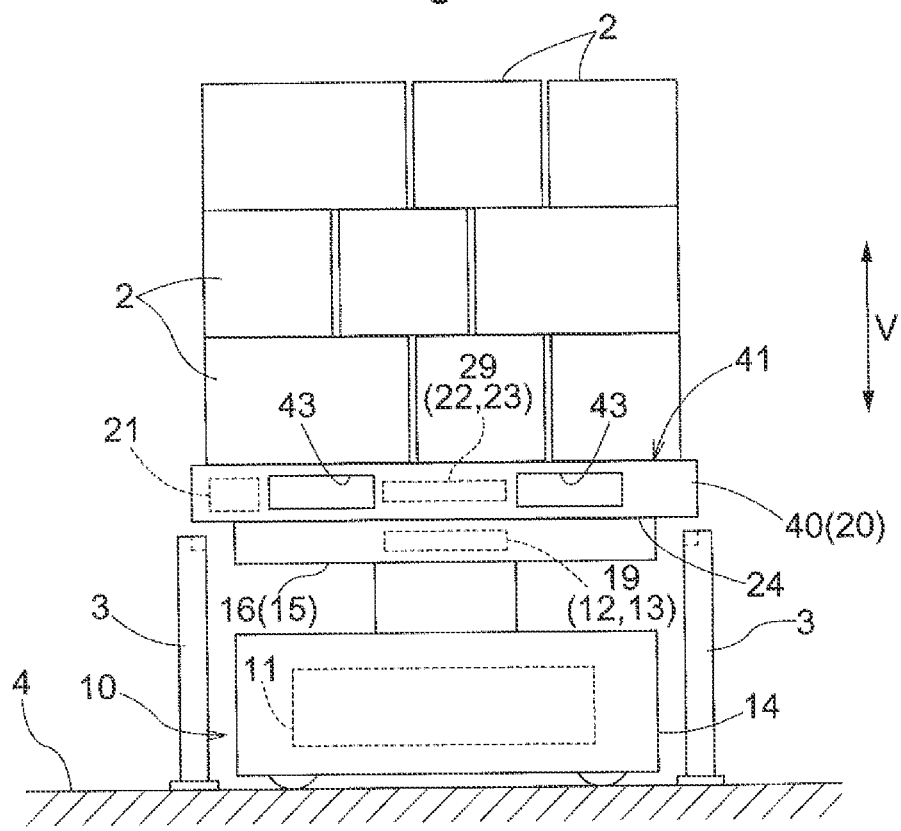
FIG. 10 is a side view of the unmanned transport vehicle and the transport body in a held state according to the second embodiment.
Figure 11:
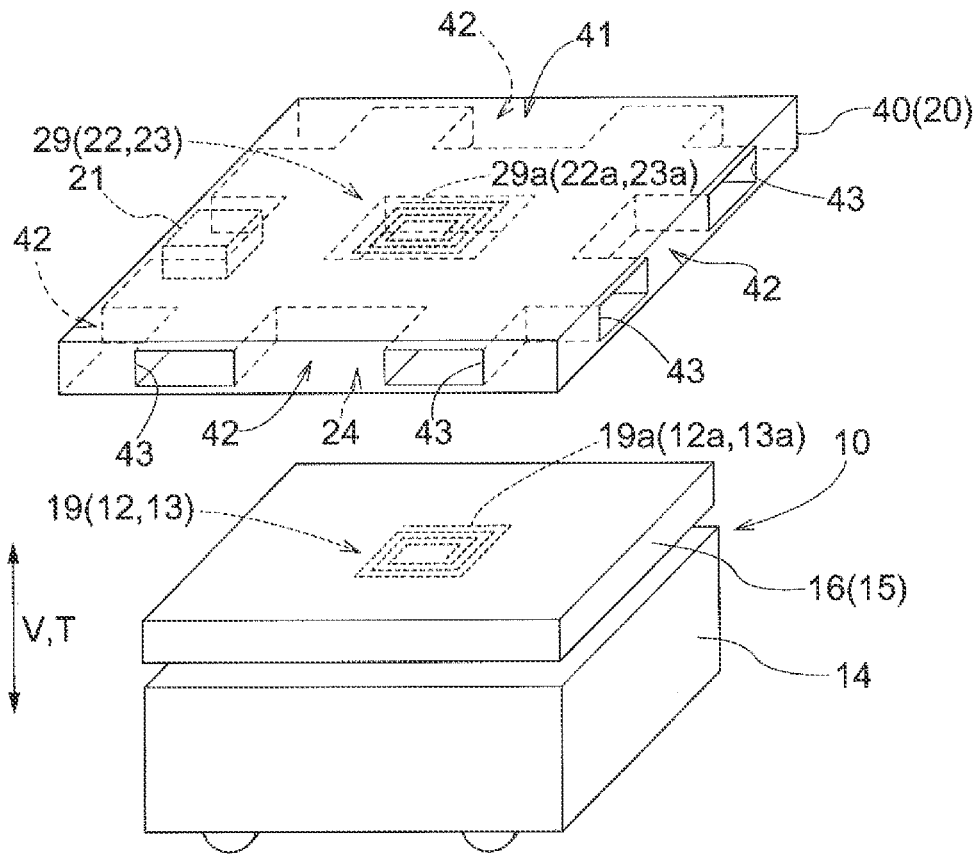
FIG. 11 is a perspective view illustrating the unmanned transport vehicle and the transport body according to the second embodiment.

As illustrated in FIGS. 9 and 11, in the present embodiment, the transport body 20 is a pallet 40 in a shape of a rectangular board with a prescribed thickness. Note that rectangular includes in its meaning both a rectangle and a square. The pallet 40 is the transport body 20 where the article 2 is placed and is provided with a placement surface 41 where the article 2 is placed. The placement surface 41 is formed on the upper surface of the pallet 40. As illustrated in FIG. 11, the transport body 20 (pallet 40) is provided with a pair of insertion holes 43 for fork insertion in at least one of four side surfaces 42 of the outer edge of the pallet 40 as seen in a board thickness direction T, the board thickness direction T being orthogonal to the placement surface 41 of the pallet 40. When a forklift supports the pallet 40, the fork of the forklift is inserted into the pallet 40 from the insertion holes 43. The pair of insertion holes 43 are formed on opposite side of the central portion of the side surface 42 (the central portion in a direction along the side surface 42 in the direction orthogonal to the board thickness direction T). The pallet 40 is held by the holding section 15 with the board thickness direction T being aligned with the vertical direction V. Thus, in a state where the pallet 40 is held by the holding section 15, a board thickness direction view and a plan view are synonymous.

As illustrated in FIG. 11, with the side surface 42 where the pair of insertion holes 43 are formed being defined as the target side surface, a pair of hole portions extending in the direction orthogonal to the target side surface are formed in the pallet 40, and the portion of each of the pair of hole portions that opens to the side surface 42 is formed as the insertion hole 43. Because the pair of hole portions are formed extending through the pallet 40, the pair of insertion holes 43 are formed in the pair of side surfaces 42 on opposite sides from one another. Also, in the present embodiment, in the pallet 40, two sets of a pair of hole portions are formed with the extension direction of the two sets being orthogonal to one another. Thus, in the present embodiment, the pair of insertion holes 43 are formed in all four of the side surfaces 42.

As illustrated in FIG. 11, in the central portion of the transport body 20 as seen in the board thickness direction, the hole portions described above that form the insertion holes 43 are not formed. Also, in the present embodiment, the second power receiving unit 22 and the second power transmitting unit 23 are disposed in the central portion of the transport body 20 as seen in the board thickness direction. In addition, in the present embodiment, the first power receiving unit 12 and the first power transmitting unit 13 are disposed in the central portion of the holding section 15 (placement section 16) as seen in a plan view. Also, the second electrical energy storage device 21 is arranged outward of the second power receiving unit 22 and the second power transmitting unit 23 so as not to overlap with the pair of insertion holes 43 (and also the pair of hole portions that form the pair of insertion holes 43) as seen in the board thickness direction. Note that, in the present embodiment, as in the first embodiment described above, the transport body 20 (pallet 40) is provided with a second power transmitting and receiving unit 29 that functions as both the second power receiving unit 22 and the second power transmitting unit 23, and the second power transmitting and receiving unit 29 is provided with a second power transmitting and receiving connection unit 29a that functions as both the second power receiving connection unit 22a and the second power transmitting connection unit 23a.

As illustrated in FIG. 9, in the present embodiment, the transport body 20 is placed on a support body 3 provided extending upward from the floor 4. Also, the unmanned transport vehicles 10 holds the transport body 20 via the holding section 15 by, after moving under the transport body 20 (see FIG. 9) with the holding section 15 in a lowered state, raising the holding section 15 and raising the transport body 20 off the support body 3 (see FIG. 10). Also, the unmanned transport vehicle 10, after moving to the position of the transportation destination D, lowers the transport body 20 at the position (see FIG. 9) by lowering the holding section 15 and placing the transport body 20 on the support body 3 (the support body 3 provided at the transportation destination D). Note that the support surface of the support body 3 for the transport body 20 may be capable of moving vertically, and the holding operation and the hold releasing operation of the transport body 20 by the holding section 15 may be performed via the raising and lowering operation of the support surface. In this possible configuration, the holding section 15 is not supported by the travel section 14 in a manner allowing for vertical movement, and the height of the holding section 15 is fixed.

Figure 12:
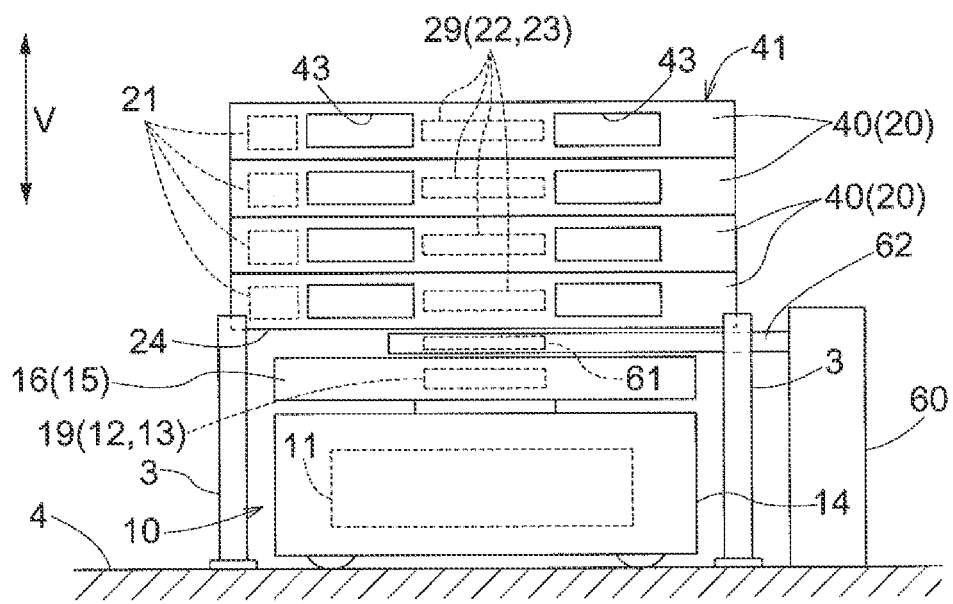
FIG. 12 is a side view of the unmanned transport vehicle, the transport body, and a charging device according to the second embodiment.

In the present embodiment, as in the first embodiment described above, the charging device 60 is capable of simultaneously charging both the first electrical energy storage device 11 of the unmanned transport vehicle 10 and the second electrical energy storage device 21 of the transport body 20. Also, in the present embodiment, as illustrated in FIG. 12, at the charging device 60, with a plurality of the transport body 20 stacked on top of one another, the second electrical energy storage devices 21 of the transport bodies 20 can be charged. By each of the transport bodies 20 disposed between the lowest transport body 20 and the highest transport body 20 supplying at least a portion of the electric power supplied from the transport body 20 below to the transport body 20 above, the electric power supplied from the power supply unit 61 of the charging device 60 can be supplied to each of the plurality of transport bodies 20 stacked on top of one another. Note that the electric power can be transmitted between the stacked transport bodies 20 via a non-contact method or a contact method.

OTHER EMBODIMENTS

Next, article transport systems according to other embodiments will be described.

1. The embodiments described above includes a configuration in which the electric power is transmitted between the unmanned transport vehicle 10 and the transport body 20 via a non-contact method. However, the present disclosure is not limited to such a configuration, and the electric power may be transmitted between the unmanned transport vehicle 10 and the transport body 20 via a contact method.

2. The embodiments described above includes a configuration in which the electric power is supplied from the power supply unit 61 to the first power receiving unit 12 and the second power receiving unit 22 via a non-contact method. However, the present disclosure is not limited to such a configuration, and the electric power from the power supply unit 61 to the first power receiving unit 12 and/or the electric power from the power supply unit 61 to the second power receiving unit 22 may be supplied via a contact method.

3. The embodiments described above includes a configuration in which the charging device 60 is capable of simultaneously charging both the first electrical energy storage device 11 of the unmanned transport vehicle 10 and the second electrical energy storage device 21 of the transport body 20. However, the present disclosure is not limited to such a configuration, and the charging device 60 for charging the first electrical energy storage device 11 and the charging device 60 for charging the second electrical energy storage device 21 may be separately provided.

4. The embodiments described above includes a configuration in which the unmanned transport vehicle 10 is provided with the first power transmitting and receiving unit 19 that functions as both the first power receiving unit 12 and the first power transmitting unit 13, and the transport body 20 is provided with a second power transmitting and receiving unit 29 that functions as both the second power receiving unit 22 and the second power transmitting unit 23. However, the present disclosure is not limited to such a configuration, and the unmanned transport vehicle 10 may be provided with the first power receiving unit 12 and the first power transmitting unit 13 separated from one another, and the transport body 20 may be provided with the second power receiving unit 22 and the second power transmitting unit 23 separated from one another. In this case, the first power receiving connection unit 12a and the first power transmitting connection unit 13a are provided separated from one another, and the second power receiving connection unit 22a and the second power transmitting connection unit 23a are provided separated from one another.

5. The embodiments described above includes a configuration in which the housing shelf 30 is provided with housing sections 31 arranged next to one another in the vertical direction V. However, the present disclosure is not limited to such a configuration, and the housing shelf 30 may be provided with only one housing section 31. Also, the first embodiment described above included a configuration in which the housing shelf 30 is directly placed on the floor 4. However, the present disclosure is not limited to such a configuration, and the housing shelf 30 may be placed on a support body (for example, a support body similar to the support body 3 illustrated in FIG. 9) provided extending upward from the floor 4.

6. The second embodiment described above includes a configuration in which the pair of insertion holes 43 are formed in all four of the side surfaces 42 of the pallet 40. However, the present disclosure is not limited to such a configuration, and, for example, the pair of insertion holes 43 may be formed in only two of the four side surfaces 42 of the pallet 40 on opposite sides from one another.

7. The first embodiment described above includes a configuration in which the transport body 20 is the housing shelf 30, and the second embodiment described above includes a configuration in which the transport body 20 is the pallet 40. However, the present disclosure is not limited to such a configuration, and the transport body 20 may be something (for example, a container) other than the housing shelf 30 and the pallet 40. Note that the arrangement position of the second electrical energy storage device 21, the second power receiving unit 22 (specifically, the second power receiving connection unit 22a), and the second power transmitting unit 23 (specifically, the second power transmitting connection unit 23a) in the transport body 20 is not limited to the positions described in the embodiments described above and may be changed as appropriate, such as being changed depending on the configuration of the transport body 20.

8. The embodiments described above includes a configuration in which the transport body 20 is supported by the holding section 15 supporting the transport body 20 from below (specifically, a configuration in which the holding section 15 is provided with the placement section 16 where the transport body 20 is placed, and the transport body 20 is provided with the placed section 24 placed on the placement section 16). However, the present disclosure is not limited to such a configuration, and how the transport body 20 is held by the holding section 15 can be changed as appropriate. Also, the embodiments described above included a configuration in which the unmanned transport vehicle 10 autonomously travels along the floor 4. However, the configuration of the unmanned transport vehicle 10 may be changed as appropriate. Note that the arrangement position of the first electrical energy storage device 11, the first power receiving unit 12 (specifically, the first power receiving connection unit 12a), and the first power transmitting unit 13 (specifically, the first power transmitting connection unit 13a) in the unmanned transport vehicle 10 is not limited to the positions described in the embodiments described above and may be changed as appropriate, such as being changed depending on the configuration of the unmanned transport vehicle 10.

9. Note that the configurations described in the embodiments described above can be used in combination with configurations described in other embodiments (including combinations embodiments described as other embodiments) as long as inconsistencies are avoided. Also, regarding the other configurations, the embodiments described in the present specification are merely examples in all aspects. Accordingly, various modifications within the range of the present disclosure can be made as appropriate.

Supplement

A summary of the article transport system described above will be given below.

An article transport system includes: a plurality of transport bodies on each of which an article is placeable or each of which is configured to house the article; a plurality of unmanned transport vehicles each configured to transport the transport body; and a control unit configured to control the transport bodies and the unmanned transport vehicles, wherein each of the unmanned transport vehicles includes: a first electrical energy storage device; a travel section configured to travel on electric power from the first electrical energy storage device, a holding section configured to hold the transport body; a first power receiving unit configured to receive electric power from an external power source and at least either charge the first electrical energy storage device or supply electric power to the travel section; and a first power transmitting unit configured to transmit electric power of the first electrical energy storage device to an external component; each of the transport bodies includes: a second electrical energy storage device; a second power receiving unit configured to receive electric power from an external power source and charge the second electrical energy storage device; and a second power transmitting unit configured to transmit electric power of the second electrical energy storage device to an external component, and the control unit is configured to selectively execute a first control of, while the unmanned transport vehicle is holding the transport body on the holding section, receiving electric power from the second electrical energy storage device via the second power transmitting unit and the first power receiving unit and at least either charging the first electrical energy storage device or supplying electric power to the travel section and a second control of, while the unmanned transport vehicle is holding the transport body on the holding section, receiving electric power from the first electrical energy storage device via the first power transmitting unit and the second power receiving unit and charging the second electrical energy storage device.

According to the present configuration, the first control, in which electric power from the second electrical energy storage device of the transport body is supplied to at least one of the firs electrical energy storage device of the unmanned transport vehicle and the travel section, and the second control, in which electric power from the first electrical energy storage device of the unmanned transport vehicle is supplied to the second electrical energy storage device of the transport body, can be selectively executed. Thus, the balance in the charge amount between the first electrical energy storage devices of the plurality of unmanned transport vehicles and the second electrical energy storage devices of the plurality of transport bodies in the article transport system overall can be constantly appropriately adjusted. Accordingly, for example, in the slack period, supply of electric power from the first electrical energy storage device of the unmanned transport vehicle not assigned with a transportation task to the second electrical energy storage device of the transport body can be actively performed. Thus, the number of times the transport bodies are transported to the charging devices can be kept to a minimum, and the charge amount of the second electrical energy storage devices of the transport bodies can be quickly increased. Also, in the busy period, supply of electric power from the second electrical energy storage device of the transport body with a large charge amount to the first electrical energy storage device of the unmanned transport vehicle can be actively performed. Thus, the number of times the unmanned transport vehicles are moved to the charging devices can be kept to a minimum, and many articles and transport bodies can be transported. In this manner, a decrease in the operation efficiency of an unmanned transport vehicle in a busy period can be minimized or prevented without having an excessive number of charging devices.

Here, preferably, the control unit, in executing the second control, supplies electric power of the first electrical energy storage device via the first power transmitting unit to the second power receiving unit in such a manner that the first electrical energy storage device keeps electric power necessary to execute a transportation task already assigned to the unmanned transport vehicle, the transportation task being a command to be assigned to each of the plurality of unmanned transport vehicles and specifying a target transport body and a transportation destination of the target transport body.

According to the present configuration, even in a case where electric power has been supplied from the first electrical energy storage device of the unmanned transport vehicle to the second electrical energy storage device of the transport body, a situation in which the unmanned transport vehicle cannot complete the transportation task assigned to it can be avoided.

Also, preferably, the control unit executes a busy/slack determination process to determine based on at least the number of transportation tasks whether a current period is a busy period or a slack period, the transportation task being a command to be assigned to each of the plurality of unmanned transport vehicles and specifying a target transport body and a transportation destination of the target transport body; in a case where the control unit has determined through the busy/slack determination process determines that the current period is the slack period, the control unit executes the second control more frequently than the first control; and in a case where the control unit has determined through the busy/slack determination process determines that the current period is the busy period, the control unit executes the first control more frequently than the second control.

According to the present configuration, in the slack period, using the unmanned transport vehicle not assigned with a transportation task, supply of electric power from the first electrical energy storage device of the unmanned transport vehicle to the second electrical energy storage device of the transport body can be actively performed. Thus, the number of times the transport bodies are transported to the charging device can be kept to a minimum, and the charge amount of the second electrical energy storage devices of the transport bodies can be quickly increased. Also, in the busy period, using the unmanned transport vehicle with a large charge amount, supply of electric power from the second electrical energy storage device of the transport body to the first electrical energy storage device of the unmanned transport vehicle can be actively performed. Thus, the number of times the unmanned transport vehicles are moved to the charging device can be kept to a minimum, and many articles and transport bodies can be transported. In this manner, a decrease in the operation efficiency of an unmanned transport vehicle in a busy period can be minimized or prevented without having an excessive number of charging devices.

Also, preferably, a charging device configured to charge the first electrical energy storage device of the unmanned transport vehicle and the second electrical energy storage device of the transport body is further provided, wherein with (i) a transportation task being a command to be assigned to each of the plurality of unmanned transport vehicles and specifying a target transport body and a transportation destination of the target transport body and (ii) a target transport vehicle being an unmanned transport vehicle that transports the target transport body, the control unit executes the second control to charge the second electrical energy storage device of the target transport body with use of electric power of the first electrical energy storage device of the target transport vehicle in a case where a charge amount of the second electrical energy storage device of the target transport body is equal to or smaller than a predetermined first charge threshold and a transportation destination of the target transport body transported by the target transport vehicle is not the charging device, and in a case where there is a charge-requiring transport body, which is the transport body with a charge amount of the second electrical energy storage device that is equal to or smaller than a second charge threshold lower than the first charge threshold, the control unit assigns, to any one of the plurality of unmanned transport vehicles, a transportation task for which the transportation target is the charge-requiring transport body and the transportation destination is the charging device, and causes the charging device to charge the second electrical energy storage device of the charge-requiring transport body.

According to the present configuration, in a case where the charge amount of the second electrical energy storage device of the target transport body is relatively small and the transportation destination of the target transport body is not the charging device, the second control is executed to charge the second electrical energy storage device of the target transport body via the electric power of the first electrical energy storage device of the target transport vehicle, allowing the charge amount of the second electrical energy storage device to be increased. Also, in a case where there is a charge-requiring transport body with a charge amount of the second electrical energy storage device that is even lower, the charge-requiring transport body can be transported to the charging device by any one of the unmanned transport vehicles and the second electrical energy storage device of the charge-requiring transport body can be charged. Thus, the number of times the transport bodies are transported to the charging device can be kept to a minimum, and the second electrical energy storage devices of the transport body can be appropriately charged as necessary.

Also, preferably, with (i) a transportation task being a command to be assigned to each of the plurality of unmanned transport vehicles and specifying a target transport body and a transportation destination of the target transport body and (ii) a target transport vehicle being an unmanned transport vehicle that transports the target transport body, the control unit executes the second control to charge the second electrical energy storage device of the target transport body with use of electric power of the first electrical energy storage device of an unmanned transport vehicle other than the target transport vehicle before start of the transport of the target transport body by the target transport vehicle in a case where a charge amount of the second electrical energy storage device of the target transport body is equal to or smaller than a predetermined third charge threshold, and a charge amount of the first electrical energy storage device of the target transport vehicle is equal to or smaller than a predetermined fourth charge threshold.

According to the present configuration, in a case where the charge amount of the second electrical energy storage device of the target transport body as per the transportation task is small and the charge amount of the first electrical energy storage device of the target transport vehicle as per the transportation task is small, the second electrical energy storage device of the target transport body can be charged via the electric power of the first electrical energy storage device of another unmanned transport vehicle before transportation as per the transportation task begins. In this manner, even in a case where the charge amount of the first electrical energy storage device of the target transport vehicle is low, the transportation as per the transportation task can be promptly begun without sending the target transport vehicle to the charging device, and the first electrical energy storage device of the target transport vehicle can be charged via the electric power of the second electrical energy storage device of the target transport body. This allows the transportation task to be promptly completed.

Also, preferably, the transport body includes a plurality of housing sections arranged in a vertical direction; each of the plurality of housing sections is capable of housing the article; and the second power receiving unit and the second power transmitting unit are below a lowermost one of the housing sections of the transport body.

According to the present configuration, the transport body is formed in the shape of a shelf provided with a plurality of housing sections arranged next to one another in the vertical direction, and, in a case where the transport body is transported while supported from below by the unmanned transport vehicle, electric power can be easily and appropriately transmitted between the first power receiving unit and the first power transmitting unit of the unmanned transport vehicle and the second power receiving unit and the second power transmitting unit of the transport body.

Also, preferably, the transport body is a pallet in a shape of a rectangular board with a prescribed thickness and includes a pair of insertion holes for fork insertion in at least one of four side surfaces of an outer edge of the pallet as seen in a board thickness direction, the board thickness direction being orthogonal to a placement surface of the pallet on which the article is placeable; the second power receiving unit and the second power transmitting unit are disposed in a central portion of the transport body as seen in the board thickness direction; and the second electrical energy storage device is arranged outward of the second power receiving unit and the second power transmitting unit so as not to overlap with the pair of insertion holes as seen in the board thickness direction.

According to the present configuration, in a case where the transport body is a pallet, and the transport body is transported while supported from below by the unmanned transport vehicle, electric power can be easily and appropriately transmitted between the first power receiving unit and the first power transmitting unit of the unmanned transport vehicle and the second power receiving unit and the second power transmitting unit of the transport body. Also, this configuration is preferable because the second electrical energy storage device is disposed at an appropriate position that does not impair the function of the transport body.

Also, preferably, a charging device configured to charge the first electrical energy storage device of the unmanned transport vehicle and the second electrical energy storage device of the transport body is further provided, wherein the unmanned transport vehicle includes a placement section on which the transport body is placeable; the first power receiving unit includes a first power receiving connection unit electrically connected to the second power transmitting unit; the first power transmitting unit includes a first power transmitting connection unit electrically connected to the second power receiving unit; the second power receiving unit includes a second power receiving connection unit electrically connected to the first power transmitting unit; the second power transmitting unit includes a second power transmitting connection unit electrically connected to the first power receiving unit; the first power receiving connection unit and the first power transmitting connection unit are on the placement section; the second power receiving connection unit and the second power transmitting connection unit are on a placed section placed on the placement section of the transport body; the charging device includes a power supply unit configured to supply electric power to the first power receiving unit and the second power receiving unit; and the power supply unit is configured to able to be disposed between the placement section and the placed section in a vertical direction and to be able to be electrically connected to both the first power receiving connection unit and the second power receiving connection unit when disposed in this manner and simultaneously supply electric power to both the first power receiving unit and the second power receiving unit.

According to the present configuration, at the charging device, the first power receiving unit and the second power receiving unit can be simultaneously supplied with electric power, and the first electrical energy storage device of the unmanned transport vehicle and the second electrical energy storage device of the transport body can be simultaneously charged. Thus, the number of charging devices can be kept to a minimum, and charging can be performed efficiently by only charging when necessary.

The article transport system according to the present disclosure is only required to achieve at least one of the effects described above.

What is claimed is:

1. An article transport system, comprising:
a plurality of transport bodies on each of which an article is placeable or each of which is configured to house the article;
a plurality of unmanned transport vehicles each configured to transport a transport body; and
a control unit configured to control the transport bodies and the unmanned transport vehicles, wherein each of the unmanned transport vehicles comprises:
a first electrical energy storage device;
a travel section configured to travel on electric power from the first electrical energy storage device;
a holding section configured to hold the transport body;
a first power receiving unit configured to receive electric power from an external power source and at least either charge the first electrical energy storage device or supply electric power to the travel section; and
a first power transmitting unit configured to transmit electric power of the first electrical energy storage device to an external component;
wherein each of the transport bodies comprises:
a second electrical energy storage device;

a second power receiving unit configured to receive electric power from an external power source including the first electrical energy storage device and charge the second electrical energy storage device; and
a second power transmitting unit configured to transmit electric power of the second electrical energy storage device to an external component, and
wherein the control unit is configured to selectively execute:
a first control of, while the unmanned transport vehicle is holding the transport body on the holding section, receiving electric power from the second electrical energy storage device via the second power transmitting unit and the first power receiving unit and at least either charging the first electrical energy storage device or supplying electric power to the travel section; and
a second control of, while the unmanned transport vehicle is holding the transport body on the holding section, receiving electric power from the first electrical energy storage device via the first power transmitting unit and the second power receiving unit and charging the second electrical energy storage device.

2. The article transport system according to claim 1, wherein the control unit, in executing the second control, supplies electric power of the first electrical energy storage device via the first power transmitting unit to the second power receiving unit in such a manner that the first electrical energy storage device keeps electric power necessary to execute a transportation task already assigned to the unmanned transport vehicle, the transportation task being a command to be assigned to each of the plurality of unmanned transport vehicles and specifying a target transport body and a transportation destination of the target transport body.

3. The article transport system according to claim 1, wherein:
the control unit executes a busy/slack determination process to determine based on at least a number of transportation tasks whether a current period is a busy period or a slack period, each of the transportation tasks being a command to be assigned to each of the plurality of unmanned transport vehicles and specifying a target transport body and a transportation destination of the target transport body;
in a case where the control unit has determined through the busy/slack determination process that the current period is the slack period, the control unit executes the second control more frequently than the first control; and
in a case where the control unit has determined through the busy/slack determination process that the current period is the busy period, the control unit executes the first control more frequently than the second control.

4. The article transport system according to claim 1, further comprising:
a charging device configured to charge the first electrical energy storage device of the unmanned transport vehicle and the second electrical energy storage device of the transport body, and
wherein:
with (i) a transportation task being a command to be assigned to each of the plurality of unmanned transport vehicles and specifying a target transport body and a transportation destination of the target transport body and (ii) a target transport vehicle being an unmanned transport vehicle that transports the target transport body, the control unit executes the second control to charge the second electrical energy storage device of the target transport body with use of electric power of the first electrical energy storage device of the target transport vehicle in a case where a charge amount of the second electrical energy storage device of the target transport body is equal to or smaller than a predetermined first charge threshold, and a transportation destination of the target transport body transported by the target transport vehicle is not the charging device, and
in a case where there is a charge-requiring transport body, which is the transport body with a charge amount of the second electrical energy storage device that is equal to or smaller than a second charge threshold lower than the first charge threshold, the control unit assigns, to any one of the plurality of unmanned transport vehicles, a transportation task for which the transportation target is the charge-requiring transport body and the transportation destination is the charging device, and causes the charging device to charge the second electrical energy storage device of the charge-requiring transport body.

5. The article transport system according to claim 1, wherein with (i) a transportation task being a command to be assigned to each of the plurality of unmanned transport vehicles and specifying a target transport body and a transportation destination of the target transport body and (ii) a target transport vehicle being an unmanned transport vehicle that transports the target transport body, the control unit executes the second control to charge the second electrical energy storage device of the target transport body with use of electric power of the first electrical energy storage device of an unmanned transport vehicle other than the target transport vehicle before start of the transport of the target transport body by the target transport vehicle in a case where a charge amount of the second electrical energy storage device of the target transport body is equal to or smaller than a predetermined third charge threshold, and a charge amount of the first electrical energy storage device of the target transport vehicle is equal to or smaller than a predetermined fourth charge threshold.

6. The article transport system according to claim 1, wherein:
the transport body comprises a plurality of housing sections arranged in a vertical direction;
each of the plurality of housing sections is capable of housing the article; and
the second power receiving unit and the second power transmitting unit are below a lowermost one of the housing sections of the transport body.

7. The article transport system according to claim 1, wherein:
the transport body is a pallet in a shape of a rectangular board with a prescribed thickness, and comprises a pair of insertion holes for fork insertion in at least one of four side surfaces of an outer edge of the pallet as seen in a board thickness direction, the board thickness direction being orthogonal to a placement surface of the pallet on which the article is placeable;
the second power receiving unit and the second power transmitting unit are disposed in a central portion of the transport body as seen in the board thickness direction; and the second electrical energy storage device is arranged outward of the second power receiving unit and the second power transmitting unit so as not to overlap with the pair of insertion holes as seen in the board thickness direction.

8. The article transport system according to claim 1, further comprising:
a charging device configured to charge the first electrical energy storage device of the unmanned transport vehicle and the second electrical energy storage device of the transport body, and
wherein:
the unmanned transport vehicle comprises a placement section on which the transport body is placeable;
the first power receiving unit comprises a first power receiving connection unit electrically connected to the second power transmitting unit;
the first power transmitting unit comprises a first power transmitting connection unit electrically connected to the second power receiving unit;
the second power receiving unit comprises a second power receiving connection unit electrically connected to the first power transmitting unit;
the second power transmitting unit comprises a second power transmitting connection unit electrically connected to the first power receiving unit;
the first power receiving connection unit and the first power transmitting connection unit are on the placement section;
the second power receiving connection unit and the second power transmitting connection unit are on a placed section placed on the placement section of the transport body;
the charging device comprises a power supply unit configured to supply electric power to the first power receiving unit and the second power receiving unit; and
the power supply unit is configured to able to be disposed between the placement section and the placed section in a vertical direction and to be able to be electrically connected to both the first power receiving connection unit and the second power receiving connection unit when disposed in this manner and simultaneously supply electric power to both the first power receiving unit and the second power receiving unit.

* * * * *